(12) United States Patent
Kalanovic

(10) Patent No.: US 7,501,603 B2
(45) Date of Patent: Mar. 10, 2009

(54) POSITIONING APPARATUS AND METHOD INCORPORATING MODULAR GIMBAL UNIT AND JEWELRY PROCESSING SYSTEM INCORPORATING THE POSITIONING APPARATUS

(76) Inventor: Vojislav Kalanovic, 5305 Chateaux Ridge Ct., Rapid City, SD (US) 57702

( * ) Notice: Subject to any disclaimer, the term of this patent is extended or adjusted under 35 U.S.C. 154(b) by 671 days.

(21) Appl. No.: 11/088,580

(22) Filed: Mar. 23, 2005

(65) Prior Publication Data
US 2006/0213048 A1    Sep. 28, 2006

(51) Int. Cl.
*B23K 26/08* (2006.01)
(52) U.S. Cl. .............. 219/121.78; 219/121.6; 219/121.86
(58) Field of Classification Search ............ 219/121.82, 219/121.78, 121.6, 121.84, 121.86; 318/561, 318/568.11, 640
See application file for complete search history.

(56) References Cited

U.S. PATENT DOCUMENTS

| | | | | |
|---|---|---|---|---|
| 3,612,814 | A * | 10/1971 | Houldcroft | 219/121.82 |
| 4,752,455 | A * | 6/1988 | Mayer | 219/121.6 |
| 4,760,583 | A * | 7/1988 | Sasnett et al. | 372/109 |
| 5,196,774 | A * | 3/1993 | Baciak et al. | 318/569 |
| 5,259,722 | A * | 11/1993 | Inoue et al. | 269/71 |
| 5,917,300 | A | 6/1999 | Tanquary et al. | |
| 5,922,225 | A * | 7/1999 | Blake | 219/121.82 |
| 5,993,550 | A * | 11/1999 | Eloy | 219/121.84 |
| 6,152,289 | A * | 11/2000 | Wark et al. | 198/493 |
| 6,172,470 | B1 * | 1/2001 | Sathoff et al. | 318/568.11 |
| 6,230,072 | B1 * | 5/2001 | Powell et al. | 700/195 |
| 6,396,233 | B1 * | 5/2002 | Christison et al. | 318/625 |
| 6,600,128 | B2 * | 7/2003 | Lai | 219/121.83 |
| 6,714,839 | B2 * | 3/2004 | Salisbury et al. | 700/245 |
| 6,738,691 | B1 * | 5/2004 | Colgate et al. | 700/245 |
| 6,814,823 | B1 * | 11/2004 | White | 700/119 |
| 6,915,568 | B2 * | 7/2005 | Haehnel | 29/888.09 |
| 6,978,989 | B2 * | 12/2005 | Glaser et al. | 269/71 |

(Continued)

FOREIGN PATENT DOCUMENTS

JP        62-253777 A   * 11/1987

OTHER PUBLICATIONS

Polishing Robot PR/RX60, Buko Precision Machines, Exact date unknown, http://www.buysschaert.com/buko_machines_htm/PR%20RX%2060/PR%20RX%2060%20Engels.htm.

(Continued)

*Primary Examiner*—Geoffrey S Evans
(74) *Attorney, Agent, or Firm*—Gordon & Rees, LLP

(57) ABSTRACT

A gimbal unit for increasing the number of degrees of freedom of a positioning apparatus has three perpendicular rotary joints and drive motors for driving each joint independently for rotation about x, y and z rotary axes, a first adapter for securing one end of the unit to a transportation device such as a gantry slider or a robotic arm, and a second adapter for securing the opposite end of the unit to a gripper or a tool. When the gimbal unit is secured to a slider of a gantry unit having three perpendicular translational axes, and a gripper or tool is secured to the gimbal unit, a controller can control movement of the gripper or tool along the three translational axes and about the three rotational axis for suitable positioning at one or more work stations on a work table of the gantry.

26 Claims, 36 Drawing Sheets

U.S. PATENT DOCUMENTS 7,095,376 B1 * 8/2006 Timothy et al. ............. 343/705
2001/0006168 A1 * 7/2001 Okumura et al. ......... 219/121.7

OTHER PUBLICATIONS

Modular "Balanced" Gantry Robot Systems, Composite Systems, Inc., 2004, http://www.compositemfg.com/GantryRobots.htm.

R-100 Ring Grinding and Polishing Systems, Superior Robotics, Inc., 2004, http://www.superiorrobotics.com/images/SR-R100_System.doc.

United Robotic Integrations, LLC, URI R-100 Interface Software, Apr. 2002, http://www.unitedrobotic.com/R-100software.htm.

United Robotic Integrations, LLC, R-110 Ring Finishing System, Apr. 2002, http://www.unitedrobotic.com/r100.htm.

* cited by examiner

SECTION A-A

Fig. 25.a

POSITIONING APPARATUS AND METHOD INCORPORATING MODULAR GIMBAL UNIT AND JEWELRY PROCESSING SYSTEM INCORPORATING THE POSITIONING APPARATUS

BACKGROUND OF THE INVENTION

The present invention relates generally to an apparatus and method for positioning articles which are undergoing processing at various work stations, and is particularly concerned with a system incorporating the positioning apparatus for handling, grinding, repairing, polishing, engraving, stamping and controlling material removal or addition in forming or finishing metal parts such as jewelry, aircraft parts, or the like.

Since the jewelry industry evolved into a manufacturing industry rather than a simple hand crafting industry, there has been a need for an automatic method and apparatus for grinding, polishing and repair of jewelry, as well as for initial creation of jewelry without casting. Some of these tasks are still typically carried out by hand, and jewelry making is still a very labor intensive process. For a typical jewelry manufacturer, the initial creation of a jewelry piece is carried out by casting. This involves creating a master model out of steel, creation of wax copies of the master, and then using an investment casting process to create a final jewelry piece out of precious metal alloy. This process creates sprues and requires coarse grinding as well as fine grinding and polishing in order to finish the piece. In this process, over 60% of the labor time is dedicated to finishing the piece of jewelry. These tasks are typically carried out by hand, with each individual piece of jewelry handled separately. The task of grinding and/or polishing of jewelry typically consists of holding a piece of jewelry against a turning grinding wheel. Such a process is monotonous, and also can present a health hazard due to the dust created during the procedure.

The existing jewelry manufacturing processes are time consuming and labor intensive. In some areas, the quality of the jewelry piece is strongly dependent on the operator. There is therefore a need for automation of at least part of the jewelry manufacturing process in order to produce a more economical, consistent and predictable product with potential savings in precious metal.

Robotic commercial systems have been used in the past to perform some jewelry finishing processes, but typically only in finishing of rings. Such robotic systems, for example the Ring Grinding and Polishing System of Superior Robotics, Inc. of Ontario, Canada, can perform the steps of sprue removal from a ring, grinding the shank on the outside of the ring, pre-polishing the outside of the ring, grinding the inside of the ring, and pre-polishing the inside of the ring. However, this system cannot handle any other types of jewelry and can perform only these limited operations.

SUMMARY OF THE INVENTION

It is an object of the present invention to provide a new and improved positioning apparatus and method for positioning of various types of parts during processing. It is a further object of the present invention to provide a processing system using the positioning apparatus for manufacture and/or finishing of items such as pieces of jewelry, aircraft parts, automobile parts or the like. It is another object of the present invention to provide a new and improved gimbal unit for use in a positioning apparatus and processing system.

According to one aspect of the present invention, a modular gimbal unit is provided for mounting on a positioning apparatus for transporting jewelry or other items to various processing stations in a processing system for manufacture and/or finishing of items such as jewelry or the like. The gimbal unit has three rotational degrees of freedom (DOF) and comprises a first rotary member for rotation about a first axis, a first drive means for rotating the first rotary member, a second drive means carried by the first rotary member, a second rotary member driven by the second drive means and rotatable about a second axis perpendicular to the first axis, a third drive means carried by the second rotary member, and a third rotary member driven by the third drive means for rotation about a third axis perpendicular to the first and second axes, all three axes of rotation intersecting at a common point. A first adapter is provided for securing the gimbal unit to a transportation device such as a gantry slider or a robotic arm, and a second adapter is provided for securing a gripper or a tool to the third rotary member.

The gimbal unit permits a gantry apparatus having three translational degrees of freedom to be modified quickly and easily to provide three additional rotational degrees of freedom, converting from three degrees of freedom (DOF) to six degrees of freedom. A robotic arm having six DOF can be converted to an apparatus with nine DOF by attaching the gimbal unit to the end of the arm.

In an exemplary embodiment of the invention, the gimbal unit is modular so that at least one drive means and rotary member is releasably secured to the other two drive means and rotary members. This allows the gimbal unit to be modified to a two DOF unit if only two additional degrees of freedom are required.

According to another aspect of the present invention, a positioning apparatus for positioning jewelry or other parts to be processed is provided, which comprises:

- a gantry unit having a frame, a horizontal work plate mounted on the frame, a first slider slidably mounted on the frame for movement in a first linear direction, a second slider slidably mounted on the first slider for movement in a second linear direction perpendicular to the first direction, and a third slider slidably mounted on the second slider for movement in a third linear direction perpendicular to the first and second directions;
- a gimbal unit mounted on the third slider above the work plate, the gimbal unit having at least two perpendicular rotational degrees of freedom and a mounting device for mounting a part on the gimbal unit; and
- a controller for controlling movement of the first, second and third sliders and rotation of the part mounted on the gimbal unit about at least two perpendicular axes of rotation;
- whereby the part can be located at a selected position on the work plate and at a selected orientation.

In an exemplary embodiment of the invention, the gimbal unit has three rotational degrees of freedom (DOF) and comprises a first rotary member for rotation about a first axis, a first drive means for rotating the first rotary member, a second drive means carried by the first rotary member, a second rotary member driven by the second drive means and rotatable about a second axis perpendicular to the first axis, a third drive means carried by the second rotary member, and a third rotary member driven by the third drive means for rotation about a third axis perpendicular to the first and second axes. The gimbal unit may be modular such that the third drive means and rotary members are removable to convert the three DOF gimbal unit into a two DOF gimbal unit.

The part mounted on the gimbal unit may be a gripper device comprising means for holding and transporting a work piece between a plurality of work stations on the horizontal work plate. The controller may also comprise means for controlling operation of each work station in turn. In an alternative embodiment, a laser may be mounted on the gimbal unit, with a workpiece secured on the work plate. The laser is positioned and oriented in space using the gantry and gimbal units. In a jewelry manufacturing application, a precious metal deposition device may also be mounted on the gimbal unit. As the laser and powder deposition device are turned in space by the 6 DOF gantry and gimbal system, the laser melts the powder in order to create a desired piece of jewelry or other article.

The controller in this arrangement controls movement of the laser device in x, y and z linear directions as well as two or three rotational directions so as to machine the work piece according to programmed specifications. In this embodiment, the laser can machine and build jewelry pieces from scratch, without casting. This eliminates the multiple steps typically required in a casting process, which comprise master modeling, wax modeling, investment casting, and sprue grinding. This will permit jewelry to be made faster and more economically. The laser may also be used for repairing jewelry, and for polishing, engraving, or the like.

The gantry unit provides three degrees of freedom (3 DOF) in linear x, y and z directions, while the attached gimbal unit provides an additional three degrees of freedom in rotational pitch, roll and yaw directions. This produces six degrees of freedom gantry system for precise positioning of a work piece such as an item of jewelry relative to a work station, or a laser machining tool relative to a work piece. The three linear and three rotational degrees of freedom allow piece manipulation in space to any desired position and orientation. Specialized gripper devices may be provided for selective attachment to the gimbal unit for holding work pieces of different shapes, such as a multiple finger gripper for rings or the like, or a gripper with a slot for holding flat pieces of jewelry. A flip station may be provided on the work plate for removing the work piece from the holder or gripper, and reversing it or allowing the gripper to hold a different region of the work piece, so that a different region is presented for processing. For example, the flip station may hold a ring while the gripper moves from a position holding the ring from the inside to a position holding the ring from the outside.

In an exemplary embodiment of the invention, the work plate or tool bed is slidably mounted on rails, and a variable force is applied to the work plate so as to control the force at which a grinding tool or the like on the tool bed is applied to a work piece. A position sensor may be located for detecting the amount of movement of the tool bed so as to indicate when a spur is removed to a desired size.

The positioning apparatus may be part of a processing system which includes a plurality of work stations located on the work plate for processing parts and a collection system for collecting precious metal scrap removed at the machining, grinding, or polishing stations. The collection system comprises a series of air ducts directing a flow of air across the tool at each work station, such as a grinding wheel, and an air collecting duct on the opposite side of each tool. The air collecting duct is connected by a passageway to a water filter and vacuum pump where the precious metal scrap is collected before the air is directed to an air outlet.

A separate crown polishing station may be provided on the work table, including a rouge applicator. This station is designed for polishing ring crowns. A cleaning and drying station may also be located on the work table. The apparatus may easily be expanded to allow increase of working capacity such as additional work stations and product storage trays, simply by extending the work plate or work table in any direction by adding work plate extensions, without requiring any additional units such as conveyors, feeders, or stackers.

The gimbal unit may be custom made and has three perpendicular axes of rotation which intersect at one point. The gimbal unit may be attached to any of the three linear sliders (x, y or z) of the gantry unit to provide a 6 DOF system. Each slider is associated with a linear motor for moving the slider along the respective axis.

According to another aspect of the present invention, a method of processing a work piece such as a piece of jewelry or the like is provided, which comprises the steps of:

mounting a part to be manipulated on a gimbal unit having at least two rotational axes, the gimbal unit being suspended from a linear slider of a gantry unit having a first linear slider movable along a first axis, a second linear slider mounted on the first linear slider and movable along a second axis perpendicular to the first axis, and a third linear slider mounted on the second linear slider and movable along a third axis perpendicular to the first and second axes;

controlling drive means for the three linear sliders to move the part to a location adjacent at least one work station; and controlling drive means for the gimbal unit to manipulate the part into desired orientations in order to complete a procedure at the work station.

In one embodiment of the method, the part mounted on the gimbal unit is a work piece to be processed at a series of work stations, and the gantry unit is controlled to move the work piece to successive work stations on completion of processing of the work piece at each work station, with the gimbal unit being controlled to manipulate the work piece as necessary at each work station. In another embodiment, the part mounted on the gimbal unit is a combined laser and powder deposition unit, and a part is created at the work station by the laser melting the powder. This eliminates the need for casting of parts such as jewelry.

In another embodiment of the invention, the gimbal unit may be mounted on the end of a robot arm rather than on a gantry unit. This will also provide additional degrees of freedom to assist in positioning and orientation of a work piece or a laser device.

Any existing gantry system may be modified by attaching the modular gimbal unit to a slider of the gantry system, converting a three DOF system to a six DOF system. The resultant combined gantry and gimbal apparatus will allow for controlled movement of any desired part for processing, or for a processing tool if attached to the gimbal unit. This will allow the modified gantry system to compete with articulated robots in processing fields which have, up to now, been reserved for such robots, for example grinding, de-burring, de-flashing, laser deposition and welding. The gimbal unit may be modular, so that each drive motor and associated rotatable member can be separated from the remainder of the gimbal unit, allowing conversion of the gimbal unit from three rotational degrees of freedom to two rotational degrees of freedom, where an additional rotation axis is not required.

The processing apparatus and method allows parts to be manipulated in space while undergoing various processing operations such as grinding, polishing, stamping, engraving, or the like. When used in conjunction with a laser and metal powder deposition device, the apparatus can also be used to manufacture parts to programmed design specifications, such as jewelry, aircraft parts, vehicle parts, and the like. In the case of jewelry manufacture, use of a laser device on the gimbal unit avoids the need for a casting process which is much more time consuming. The processing apparatus and method also allows automation of operations which have conventionally been performed by hand, such as jewelry grinding and polishing, eliminating operator fatigue and reducing hazardous operating conditions due to exposure to metal dust. The gimbal unit will be capable of withstanding large material removal forces.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 25a is a bottom plan view of the gripper unit illustrating the gripper fingers in an inner position;

DETAILED DESCRIPTION OF THE DRAWINGS

Figure 2:
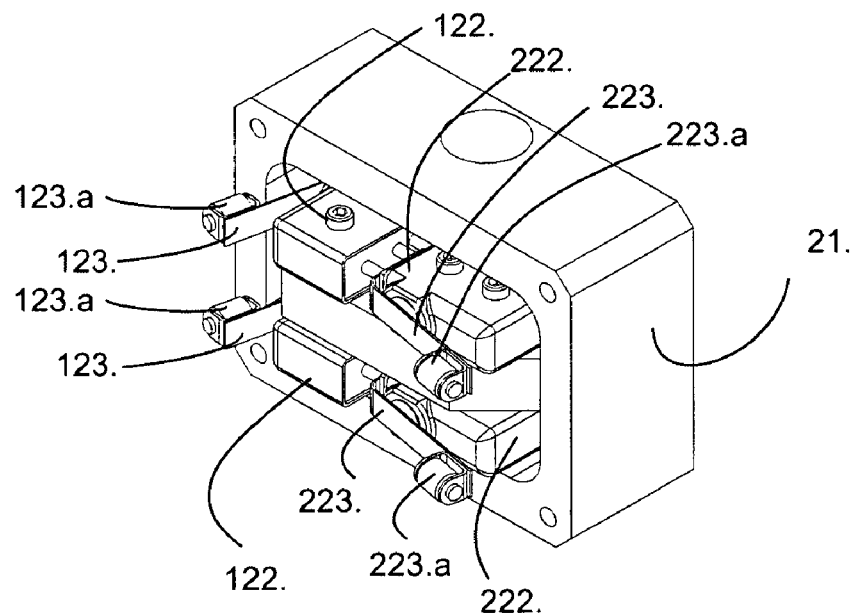
FIG. 2 is a perspective view of a switch box forming part of the gimbal unit of FIG. 1.

FIGS. 1 to 15 of the drawings illustrate a modular gimbal unit 74 according to an exemplary embodiment of the invention which may be readily used to add an additional two or three degrees of freedom to a positioning apparatus such as a gantry or robot. The gimbal unit has a yaw or x motor 9 with a gearbox 15, a pitch or y rotary motor 10 with a gearbox 16, and a roll or z direction rotary motor 11 with a gearbox 17. The motor 10 is carried on carrier or yaw plate 13 and rotates a pitch plate 12 which carries the x-motor 9. Motor 9 rotates a roll plate 14 which carries the third or z-motor 11. Motor 11 rotates an end mounting plate 20 or adapter for connection to a tool or gripper unit, as will be explained in more detail below.

Figure 3:
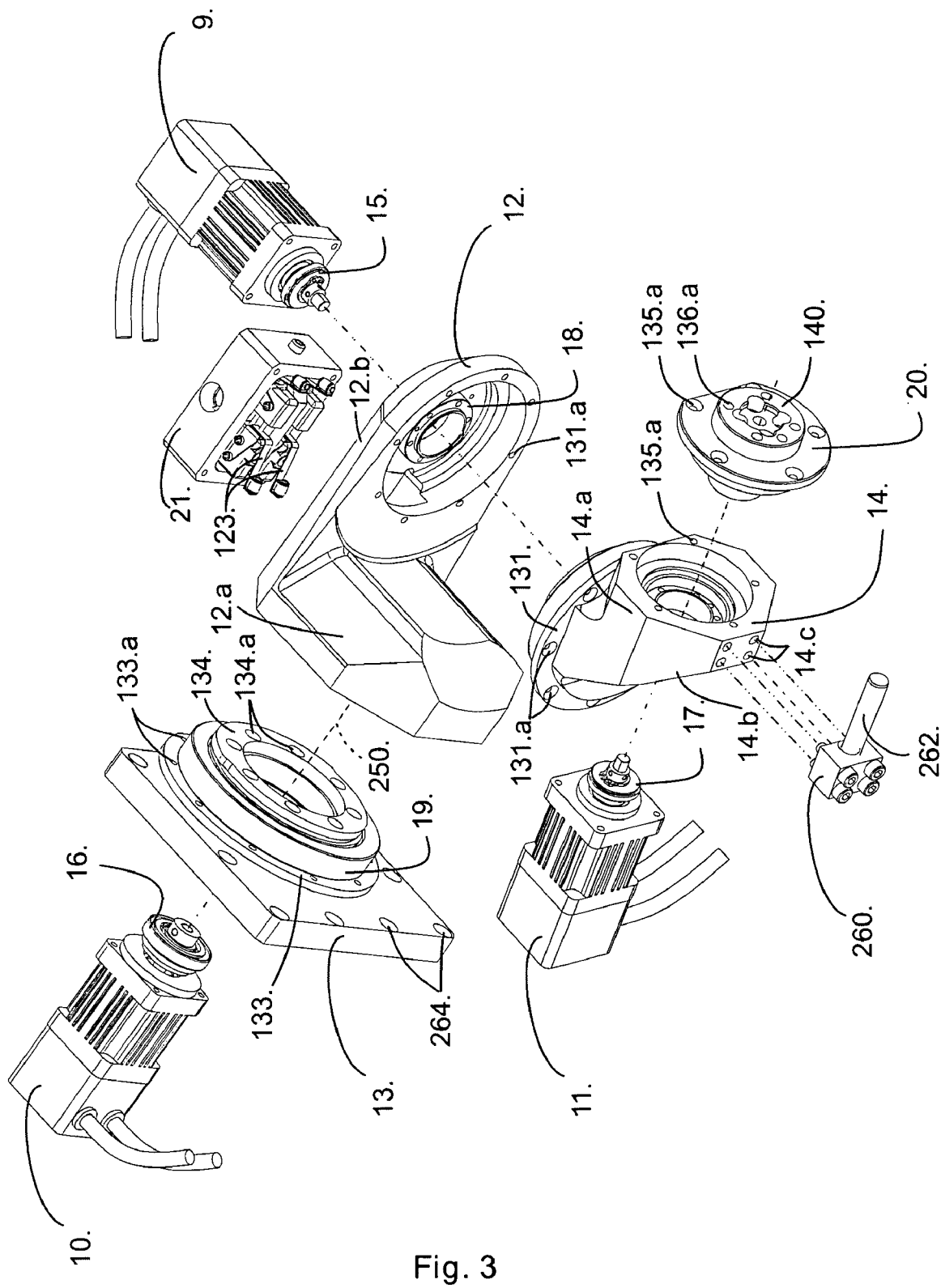
FIG. 3 is an exploded perspective view of the gimbal unit of FIG. 1, showing all the components separated.
Figure 4:
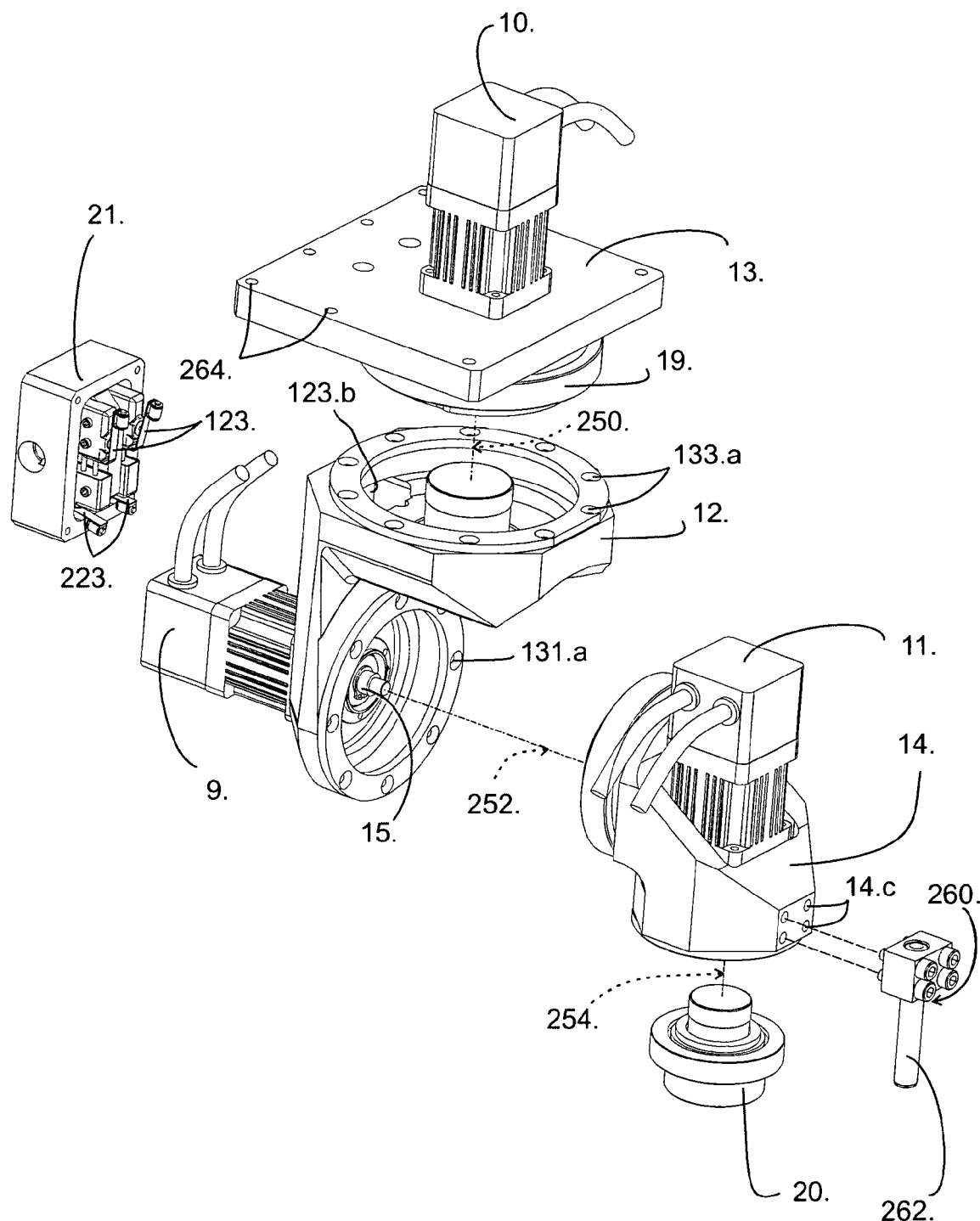
FIG. 4 is an exploded perspective view of the gimbal unit from a different direction.
Figure 5:
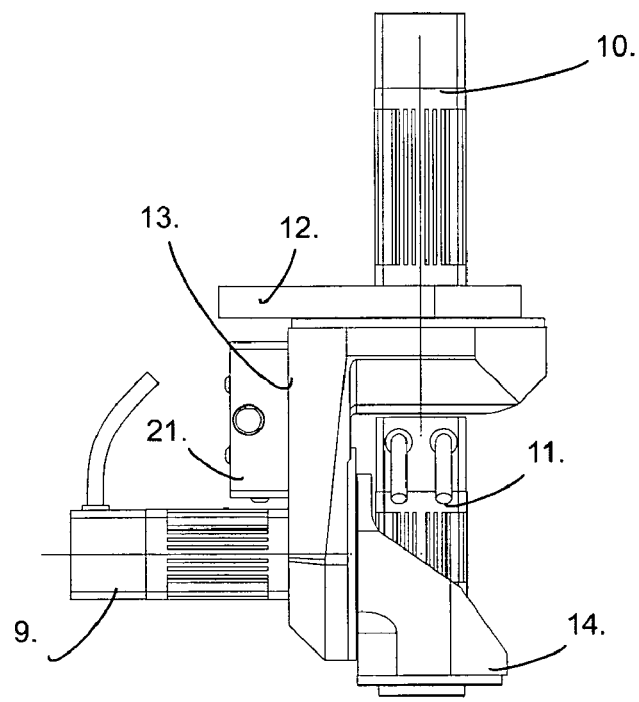
FIG. 5 is a side elevation view of the gimbal unit.
Figure 6:
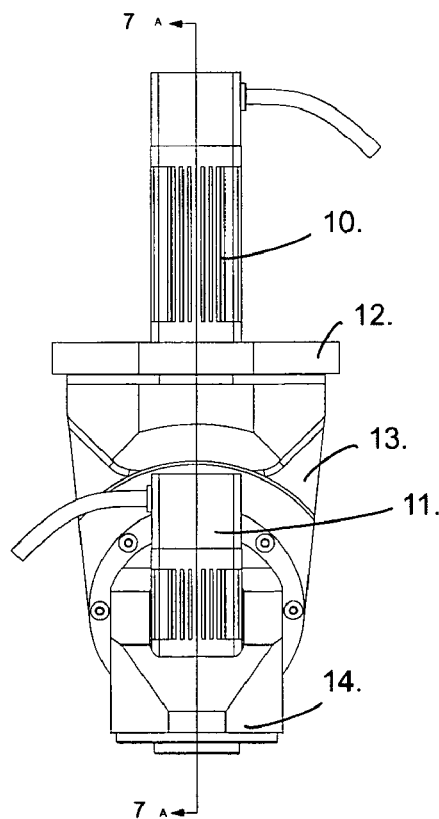
FIG. 6 is a front elevation view of the gimbal unit.
Figure 7:
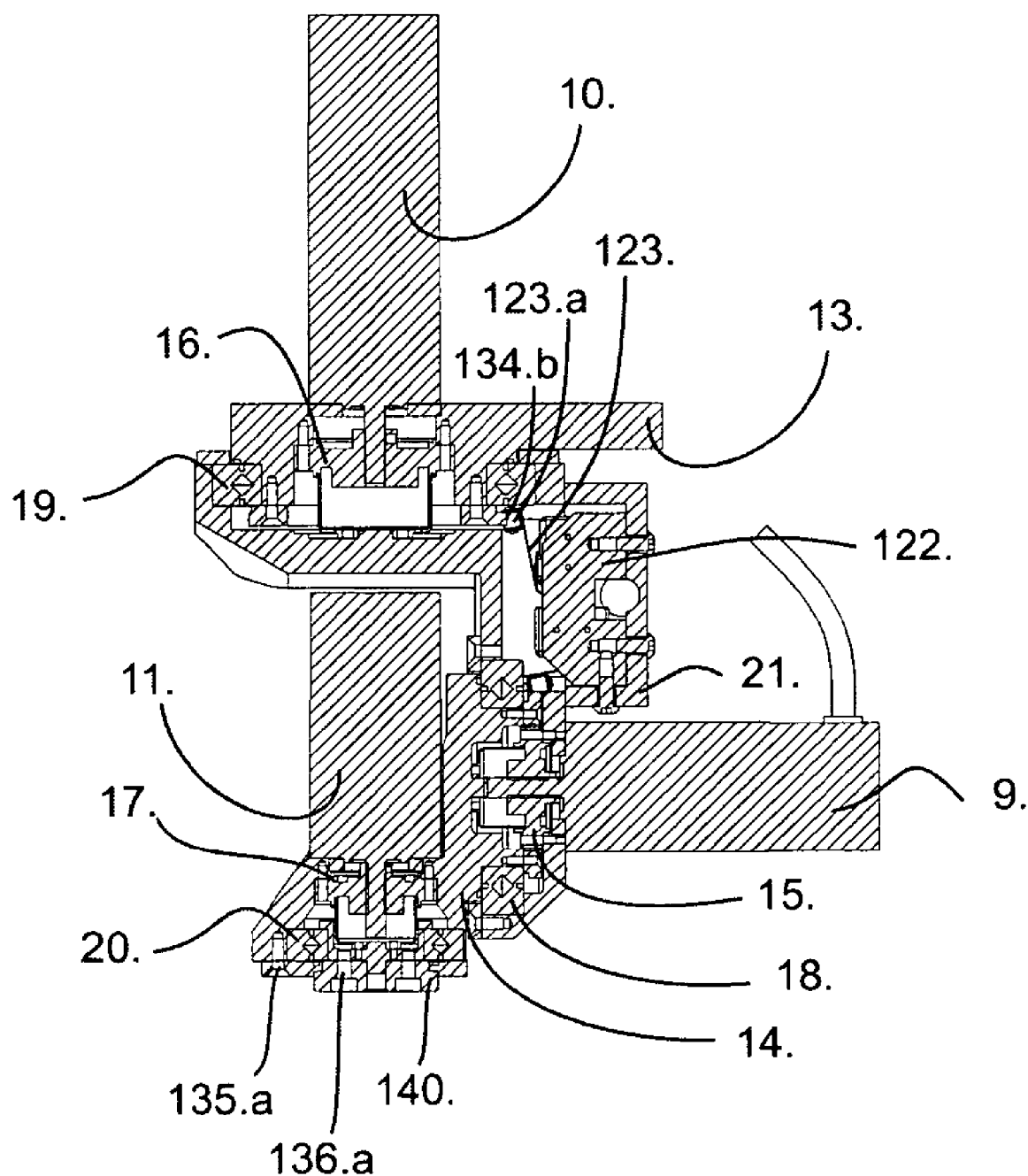
FIG. 7 is a cross sectional view on the lines 7-7 of FIG. 6.
Figure 7A:
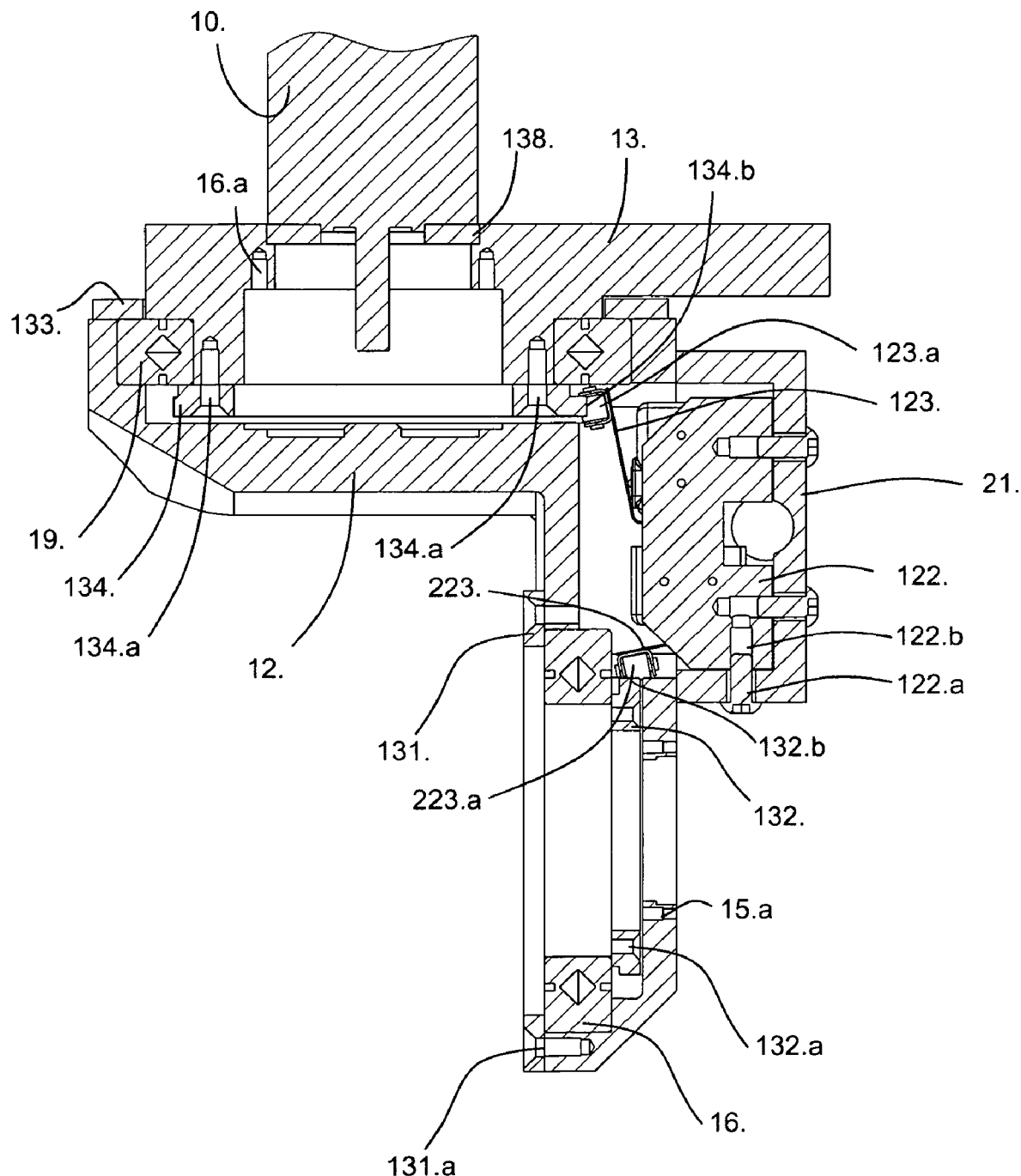
FIG. 7a is an enlarged sectional view of part of the gimbal unit as illustrated in FIG. 7, showing the x and y axis mounting plates.

The pitch plate 12 has two perpendicular portions 12a and 12b, and the roll plate 14 also has perpendicular portions 14a and 14b. Referring to FIGS. 3, 4, 7, 7a and 7b, a y ball bearing unit 19 has an inner part fixed to the yaw plate 13 by holder 134 (FIG. 7a) and screw fasteners extending through aligned openings 134a in the holder and yaw plate. Unit 19 has an outer part fixed to the portion 12a of the pitch plate by holder 133 which is fixed to the pitch plate by screws using mounting holes 133a, as shown in FIGS. 4 and 7a. This allows the pitch plate to rotate about the yaw plate, i.e. around y axis 250.

The yaw plate has an opening through which the drive shaft of the yaw or y rotary motor projects to engage and rotate the pitch plate 12 about the y axis 250. The y motor 10 is fixed to the yaw plate by screws using mounting holes 10c (see FIG. 12), with a mounting ring 138 (FIG. 7a) installed between the yaw plate and y motor prior to attachment of the motor. The y gearbox 16 is mounted on the yaw plate 13 via mounting screw holes 16a and the y motor 10 is framed to one end of the gearbox. The other part of the y gearbox is framed to the pitch plate 12.

Figure 7B:
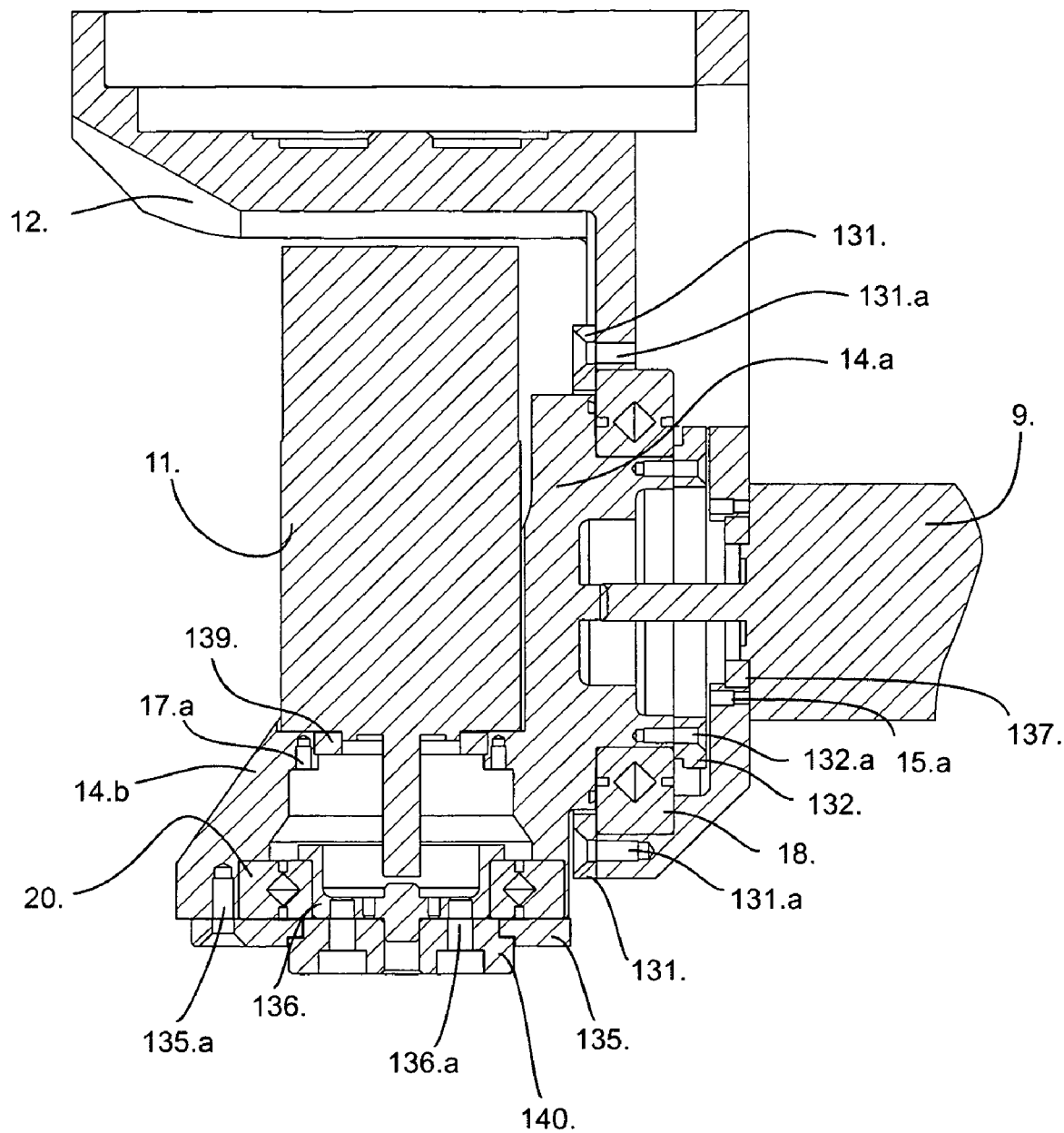
FIG. 7b is an enlarged sectional view of part of the gimbal unit as illustrated in FIG. 7, showing the x and z axis mounting plates.

An x ball bearing unit 18 has an inner part fixed to the first portion 14a of the roll plate by holder 132 via fastener screws extending through mounting holes 132a, as best illustrated in FIG. 7b. An outer part of the unit 18 is fixed to the portion 12b of the pitch plate by holder 131 via fastener screws extending through mounting holes 131a, as best illustrated in FIG. 7b. This allows the roll plate to rotate relative to the pitch plate about the x-axis 252 (FIG. 4).

Figure 11:
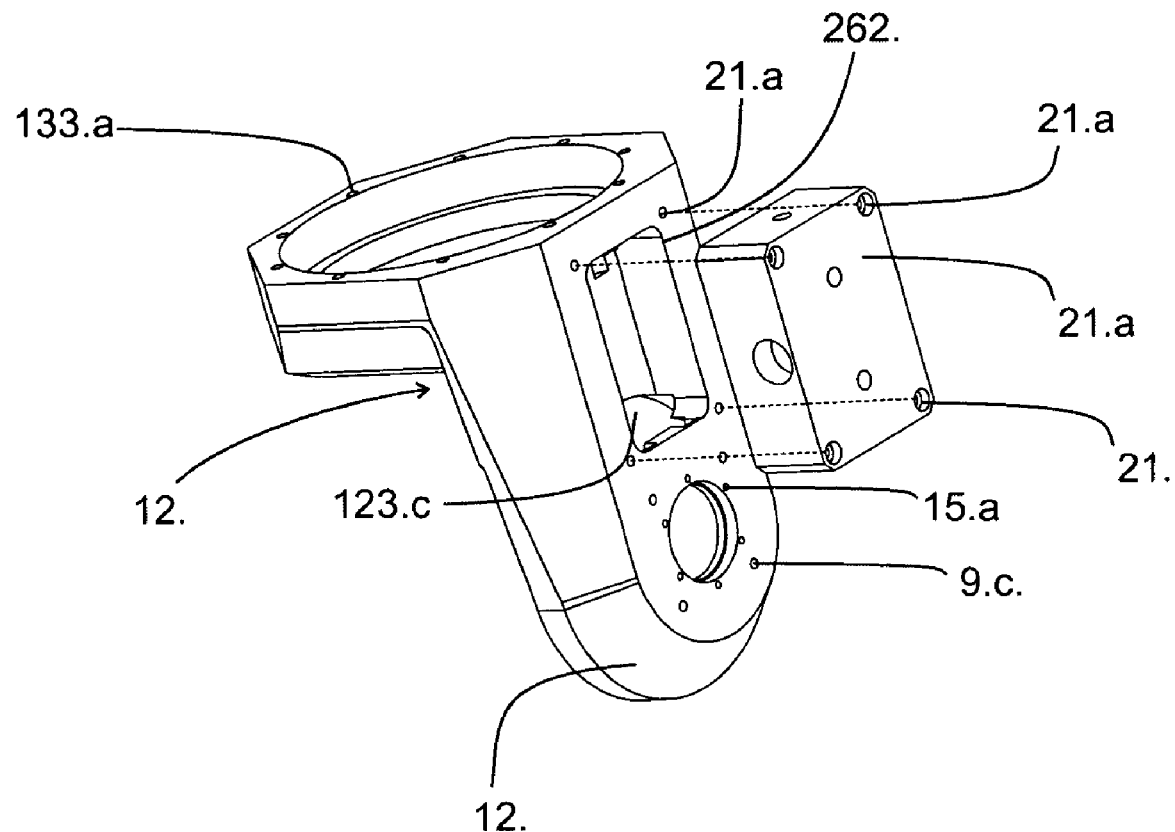
FIG. 11 is a perspective view of the pitch plate or x motor carrier of the gimbal unit of FIGS. 1 to 10.
Figure 12:
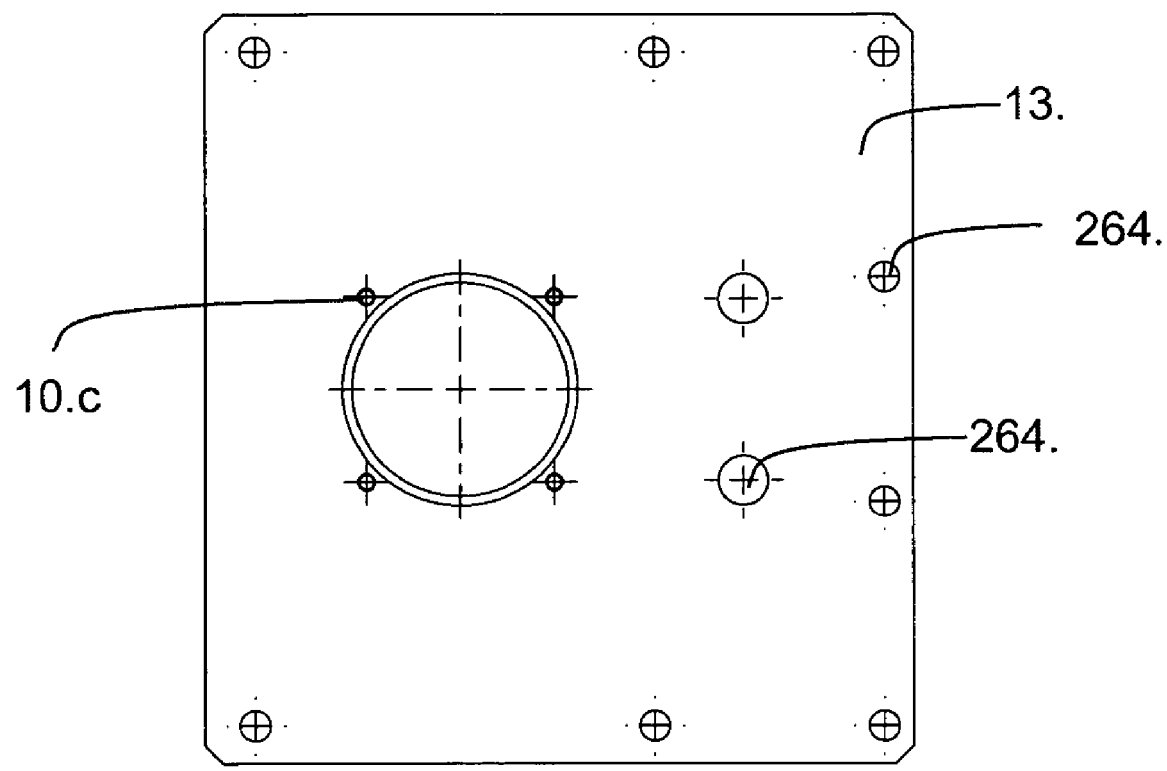
FIG. 12 is a bottom plan view of the yaw plate of FIG. 10.

The x-axis motor 9 has a drive shaft extending through an opening in portion 12b of the pitch plate, as best illustrated in FIG. 7b, and is fixed to the plate 12 by screws using mounting holes 9c (FIG. 11). Mounting ring 137 is installed prior to attachment of the motor 9 (see FIG. 7b). The x gearbox 15 is mounted to the pitch plate 12 via mounting screw holes 15a (FIG. 11) and the x axis motor 9 is framed to one end of the x gear box. The other part of the x gear box is framed to the roll plate 14 via mounting holes 15b.

The z ball bearing unit 20 is installed on the second portion 14b of the roll plate 14. Unit 20 has an inner part fixed to an interface plate 140 via holder 136 and aligned screw holes 136a in the holder 136 and interface plate 140 (see FIG. 7b) and an outer part fixed to the roll plate via holder 135 and screws extending through aligned screw holes 135a in the holder and roll plate. This allows the interface plate 140 to rotate relative to the roll plate about z-axis 254, as illustrated in FIG. 4.

Figure 13:
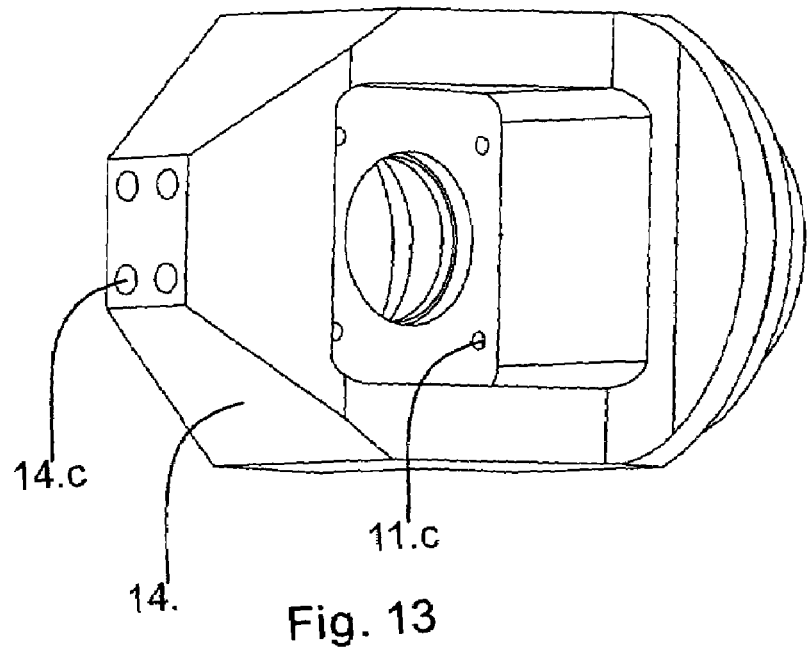
FIG. 13 is a perspective view of the roll plate of FIG. 9.
Figure 14:
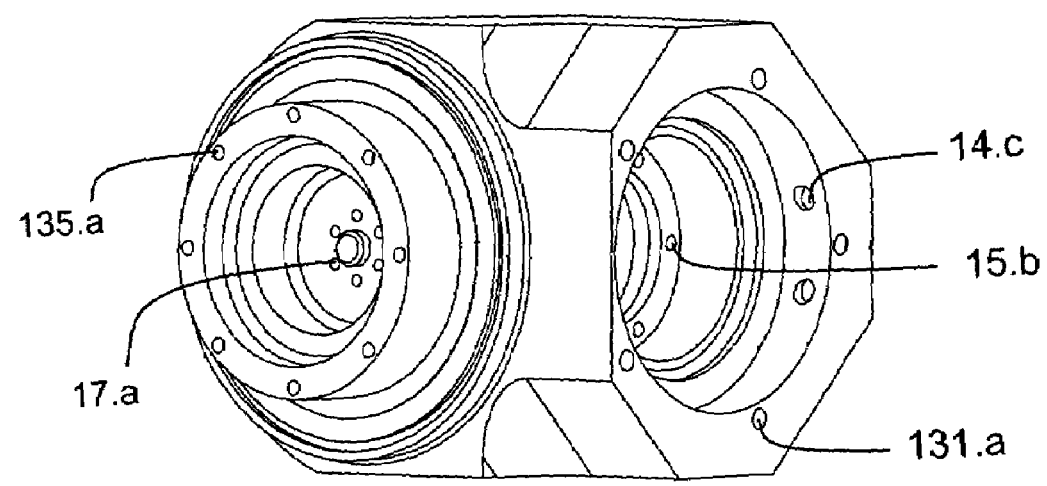
FIG. 14 is a perspective view of the roll plate taken from the opposite direction from that of FIG. 13.

The z motor 11 is fixed to the second portion 14b of the roll plate 14 using mounting holes 11c, as illustrated in FIG. 13. Prior to installation of the z motor, mounting ring 139 is installed on the roll plate as illustrated in FIG. 7b. The z gearbox 17 is mounted on the roll plate via mounting screw holes 17a and the z axis motor 11 is framed to one part of the z gear box. The other part of the z gearbox is framed to the interface plate 140.

The roll plate or part 14 also has mounting holes 14c on one outer face adjacent the mounting or interface plate 20. A torque arm or anchor device 260 is secured to the roll plate via mounting holes 14c, and has an anchor or finger 262 extending alongside the mounting plate 20, as best illustrated in FIGS. 3 and 4. This can be used to anchor a non-rotating part of a device secured to mounting plate 20, as will be explained in more detail below. The anchor device 260 will be removed when it is not required, which will depend on the type of device to be attached to the gimbal unit.

Figure 38:
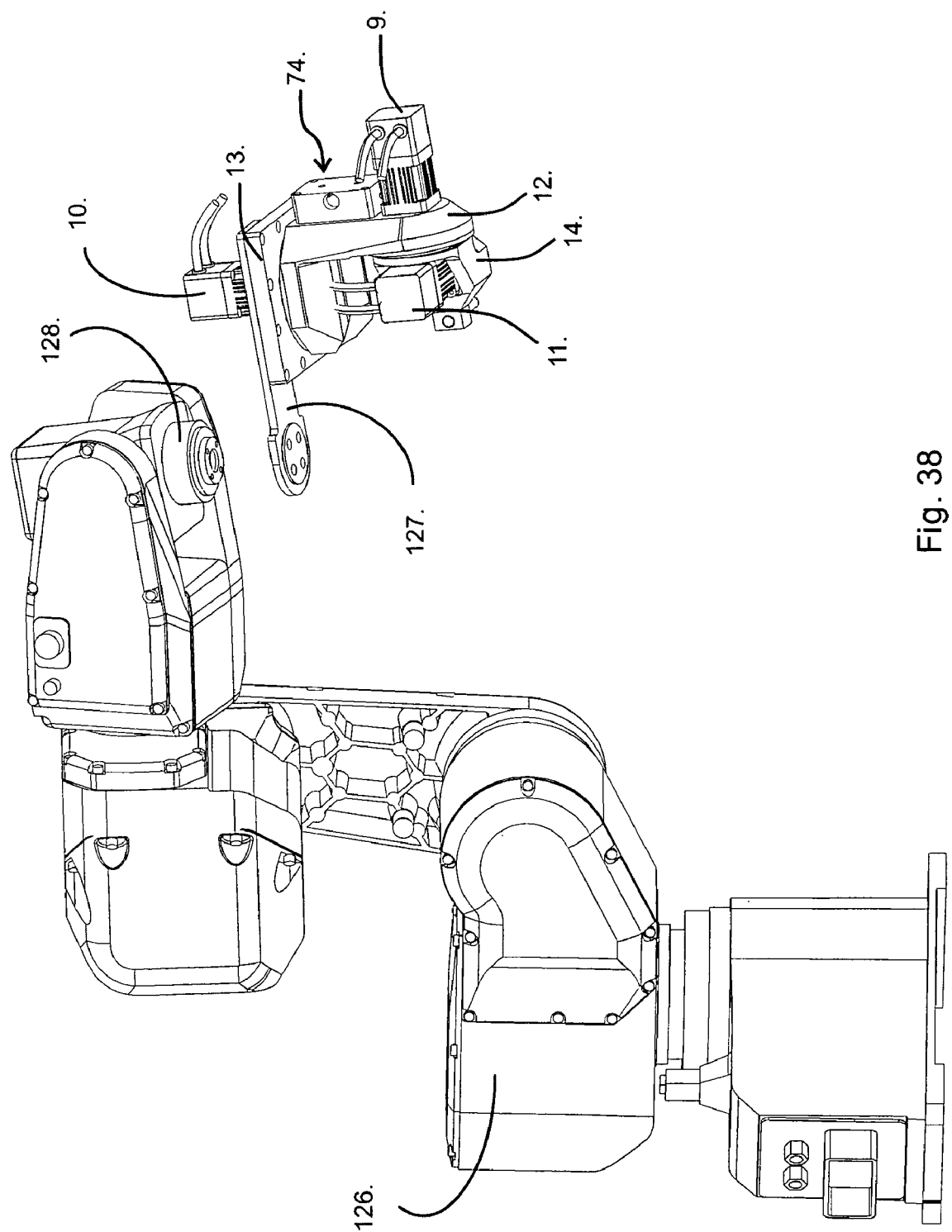
FIG. 38 is a perspective view of a robotic arm modified by addition of the gimbal unit of FIGS. 1 to 15 in order to add an additional three DOF to the six DOF robotic arm.

The yaw plate 13 has an extension to one side of its attachment to the pitch plate 12, with mounting holes 264 around the edge of the extension to permit the gimbal unit to be mounted on a positioning device such as a gantry unit or the like, as illustrated in FIGS. 16 to 19, or on a robot arm, as illustrated in FIG. 38.

Figure 1:
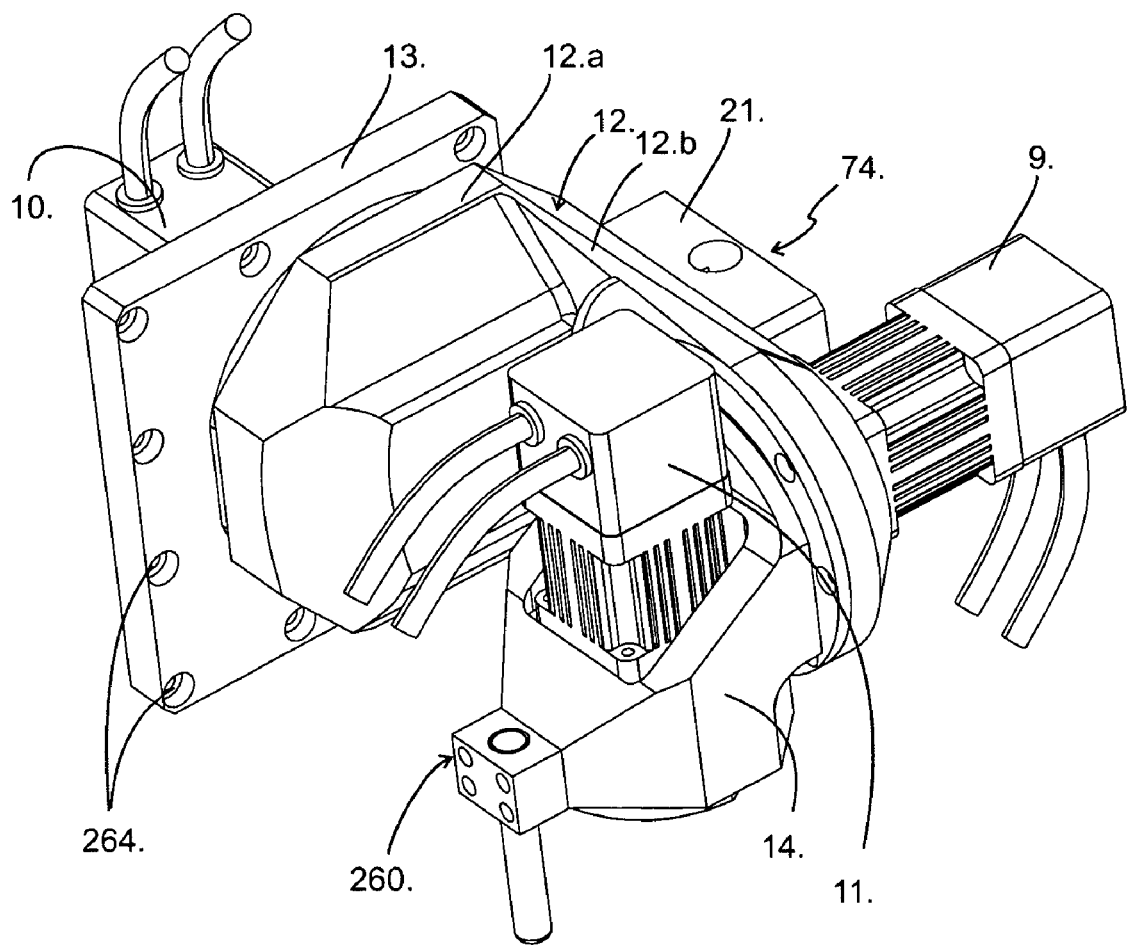
FIG. 1 is a perspective view of a modular gimbal unit according to an exemplary embodiment of the present invention for use in holding parts or tools during manufacturing or processing of parts.
Figure 9:
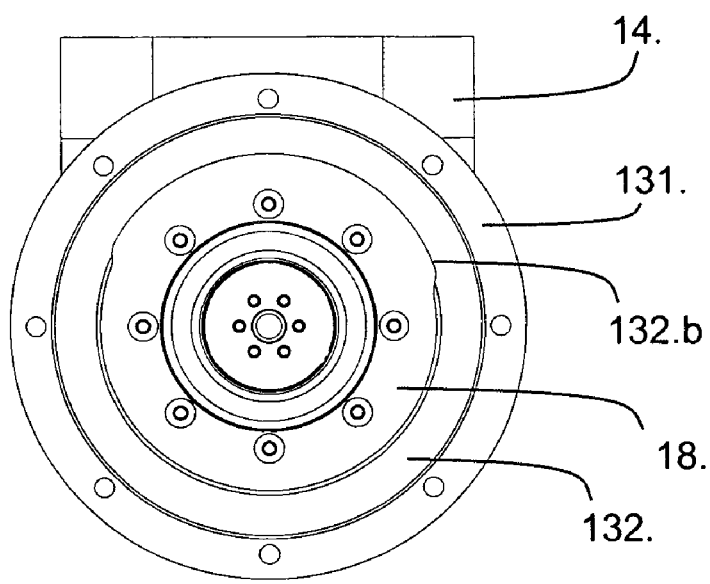
FIG. 9 is a top plan view of the roll plate or z-motor carrier of the gimbal unit of FIGS. 1 to 7.
Figure 10:
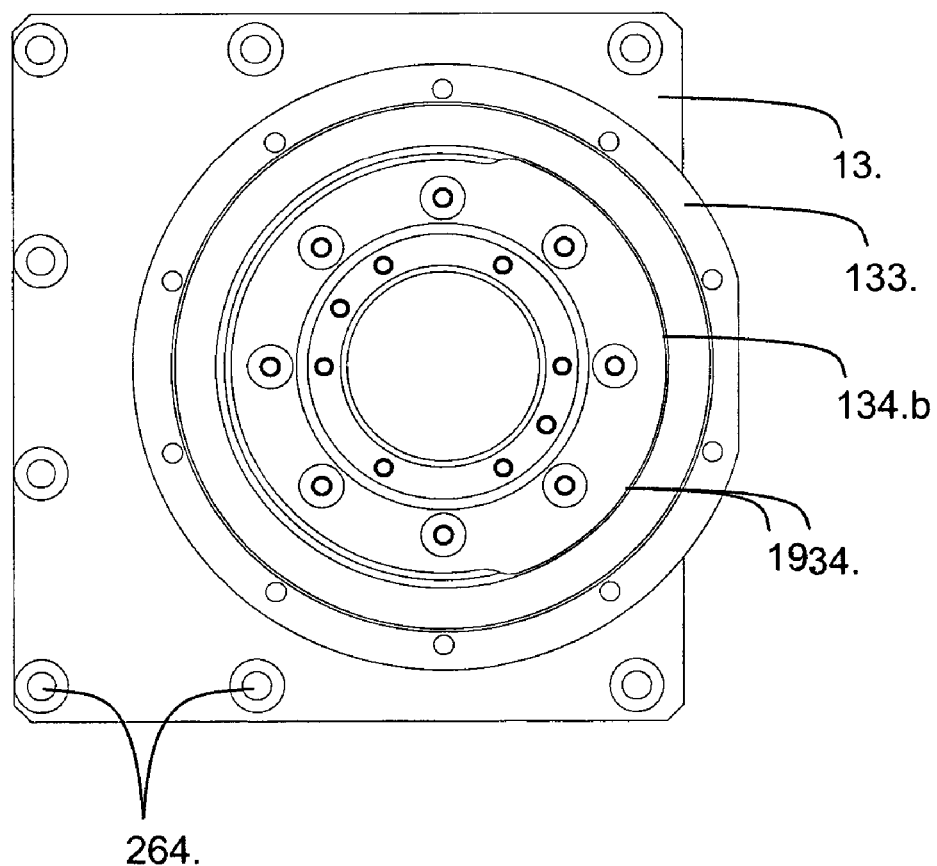
FIG. 10 is a top plan view of the yaw plate or y motor carrier of the gimbal unit of FIGS. 1 to 7.

A switch box 21 is mounted on pitch plate 12 and has switch arms 123, 223, for detecting the zero or start positions of the pitch plate 12 relative to the carrier plate 13, and the roll plate 14 relative to pitch plate 12, i.e., the zero positions of the y and x motors, respectively. FIG. 1 illustrates the zero or start position in which all three rotation axes are perpendicular to one another. Each switch arm is mounted on switch base 122 and has a roller 123a, 223a, respectively, at its free end for engaging a roller surface 134b, 132b, respectively of the carrier or yaw plate 13 and the roll plate 14, respectively, as best illustrated in FIGS. 3, 4, 7a, 9 and 10. FIG. 9 illustrates the end face of the first portion 14a of the roll plate which has an annular roller engaging surface 132b which is the outer surface of holder 132. FIG. 10 illustrates the end face of the roll plate 13 which has an annular roller engaging surface 134a which is the outer surface of holder 134.

The switch box 21 is mounted in opening 262 in the second portion 12b of the pitch plate 12, as best illustrated in FIG. 11. When the parts are assembled together, the rollers 223a at the ends of arms 223 extend through opening 123c to engage the roller engaging surface 132b on the roll plate ball bearing unit holder 132, as best illustrated in FIG. 7a. Surface 132b has steps or jogs separating a larger diameter portion from a smaller diameter portion of the roller engaging surface 132b. As the rollers travel along the smaller diameter portion while plate 14 rotates, the switch will be deactivated. When the rollers reach the larger diameter portion, the switch arms will be forced against the opposing contacts in the switch unit, activating the switch. This defines the zero position of the roll plate relative to the pitch plate or the zero position of the x-motor 9.

As illustrated in FIG. 10, the outer mating face of the yaw plate 13 has a similar annular roller surface 134b with steps or jogs separating a larger diameter portion from a smaller diameter portion of the roller surface. The rollers 123a will extend through an opening 123b at the base of mounting opening 262 (see FIG. 4) to engage surface 134b when the parts are assembled together, as best illustrated in FIG. 7a. The switch associated with each arm 123 will remain open while the rollers travel along the smaller diameter portion of this surface. When pitch plate 12 rotates, it will also rotate the switch unit 21 so that the rollers move along surface 134b. When the rollers reach the larger diameter portion of this surface, the arms will be forced against the opposing contacts, closing and activating the switches. This defines the zero position of the y-motor 10. There is no zero switch detecting the zero position of z-motor 11. Instead, the zero position for this axis is detected by software monitoring activating impulses for the z-motor. This arrangement allows signals which indicate the zero position of the gimbal unit to be transmitted to a controller.

Figure 8:
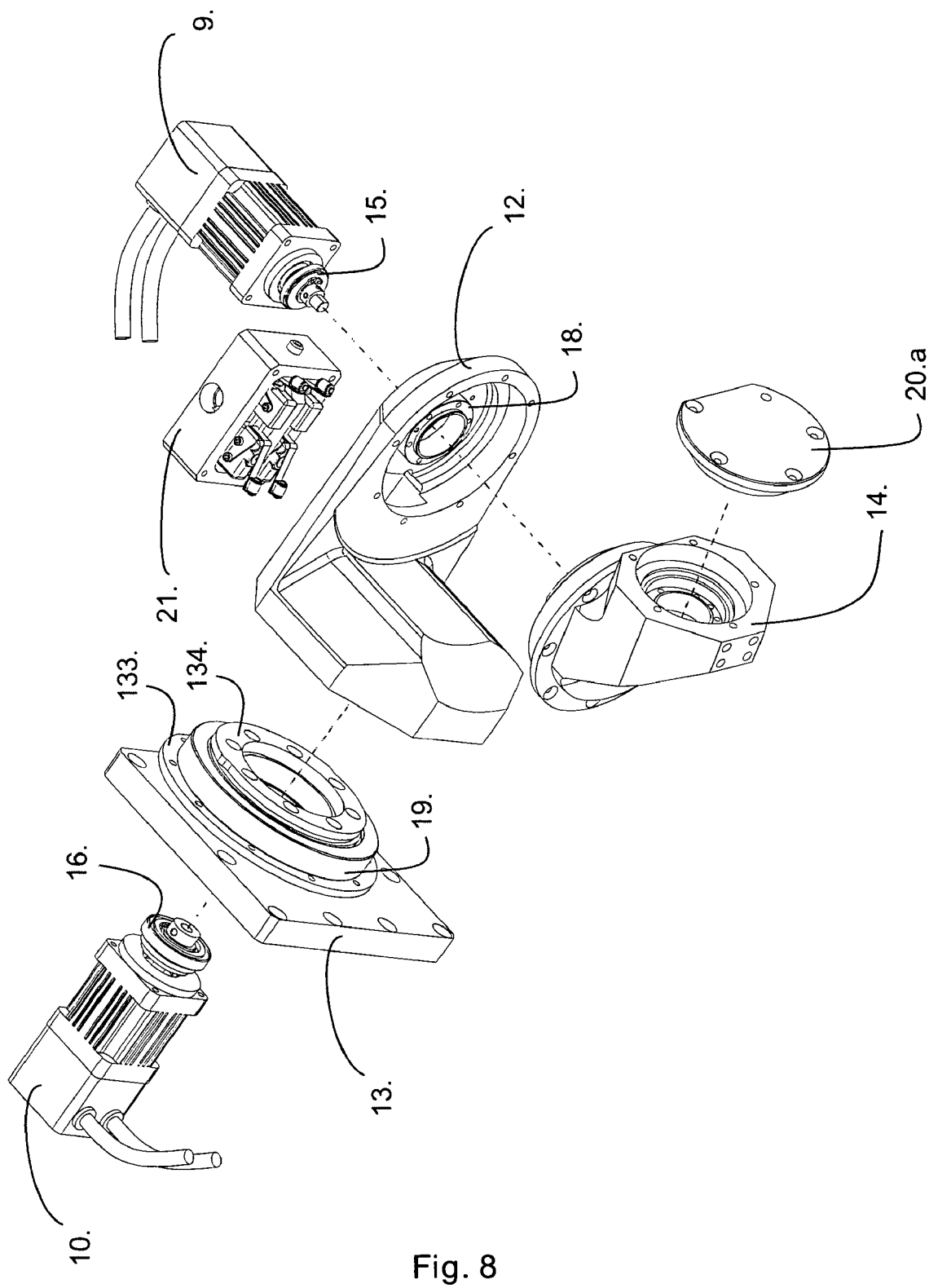
FIG. 8 is an exploded perspective view similar to FIG. 2 in which the z axis motor is removed to convert the gimbal unit from a three DOF to a two DOF gimbal unit.

The three DOF rotary gimbal unit 74 as illustrated in FIGS. 1 to 15 can be readily mounted on any positioning device to provide an additional three degrees of rotational freedom (3 DOF). Alternatively, if only two additional degrees of freedom (2 DOF) are desired, the gimbal unit can be readily modified as illustrated in FIG. 8 to convert the 3 DOF unit of FIGS. 1 to 6 into a 2 DOF unit. In FIG. 8, the anchor device 260 is removed from the roll plate 14, the z or roll motor 11 is also removed, and the rotatable mounting plate 20 is removed and replaced by a fixed interface plate 20a to which a part to be manipulated may be secured.

The modular gimbal unit 74 is extremely versatile and is a stand alone unit which can be secured to any gantry or robot system to add either two or three additional degrees of freedom. Although the gimbal unit 74 in the illustrated embodiment is mounted on such a system via interface plate 13, it will be understood that any suitable mounting means may be used to secure the gimbal unit to an appropriate location on the gantry or robot system. The gimbal unit is therefore a device or kit to enable any gantry or robot system to be transformed into a system with two or three additional degrees of freedom, providing more manipulating and positioning ability.

Figure 15:
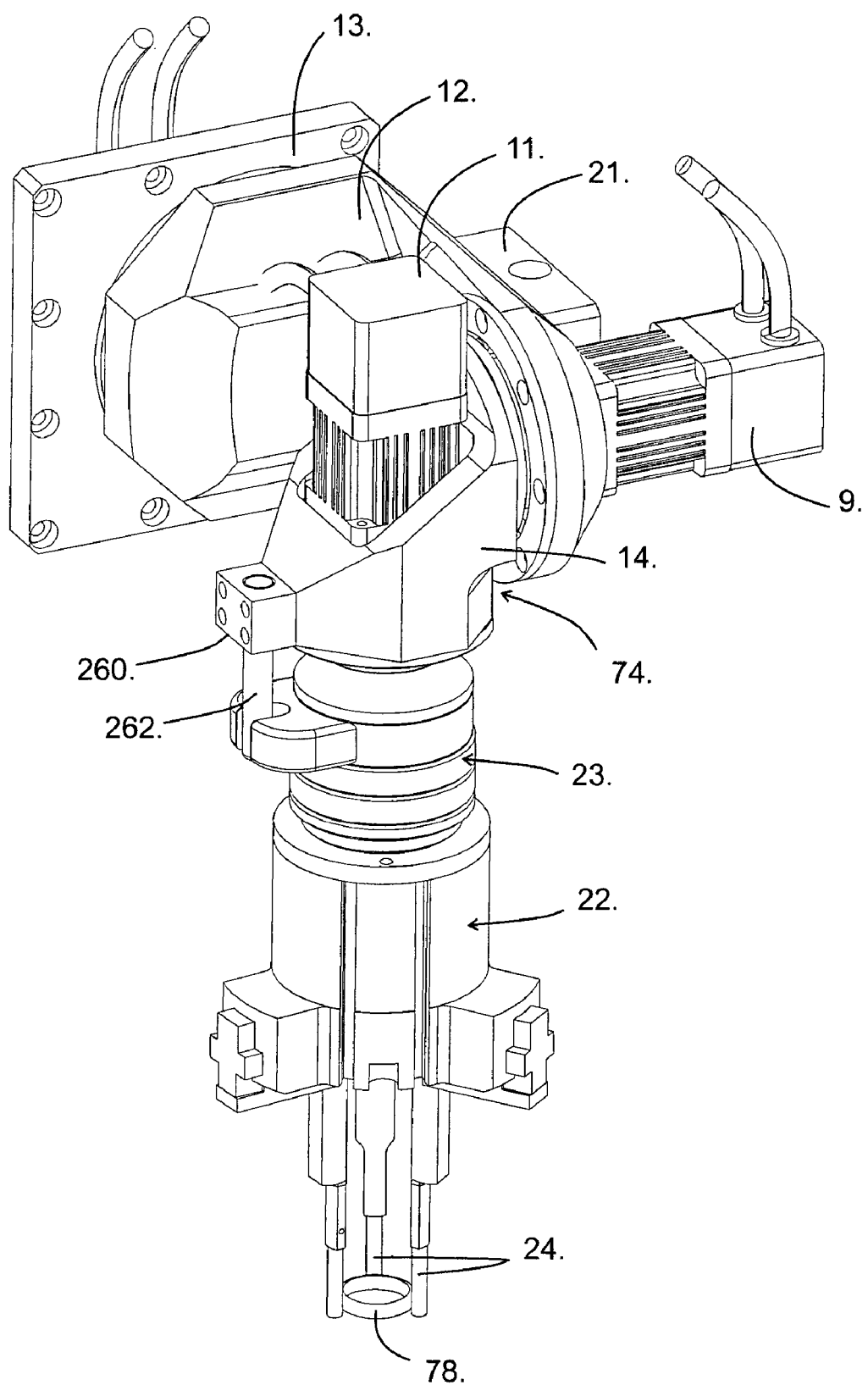
FIG. 15 is a perspective view of the gimbal unit of FIGS. 1 to 14 with a gripper unit for holding an item to be processed attached to the gimbal unit.
Figure 16:
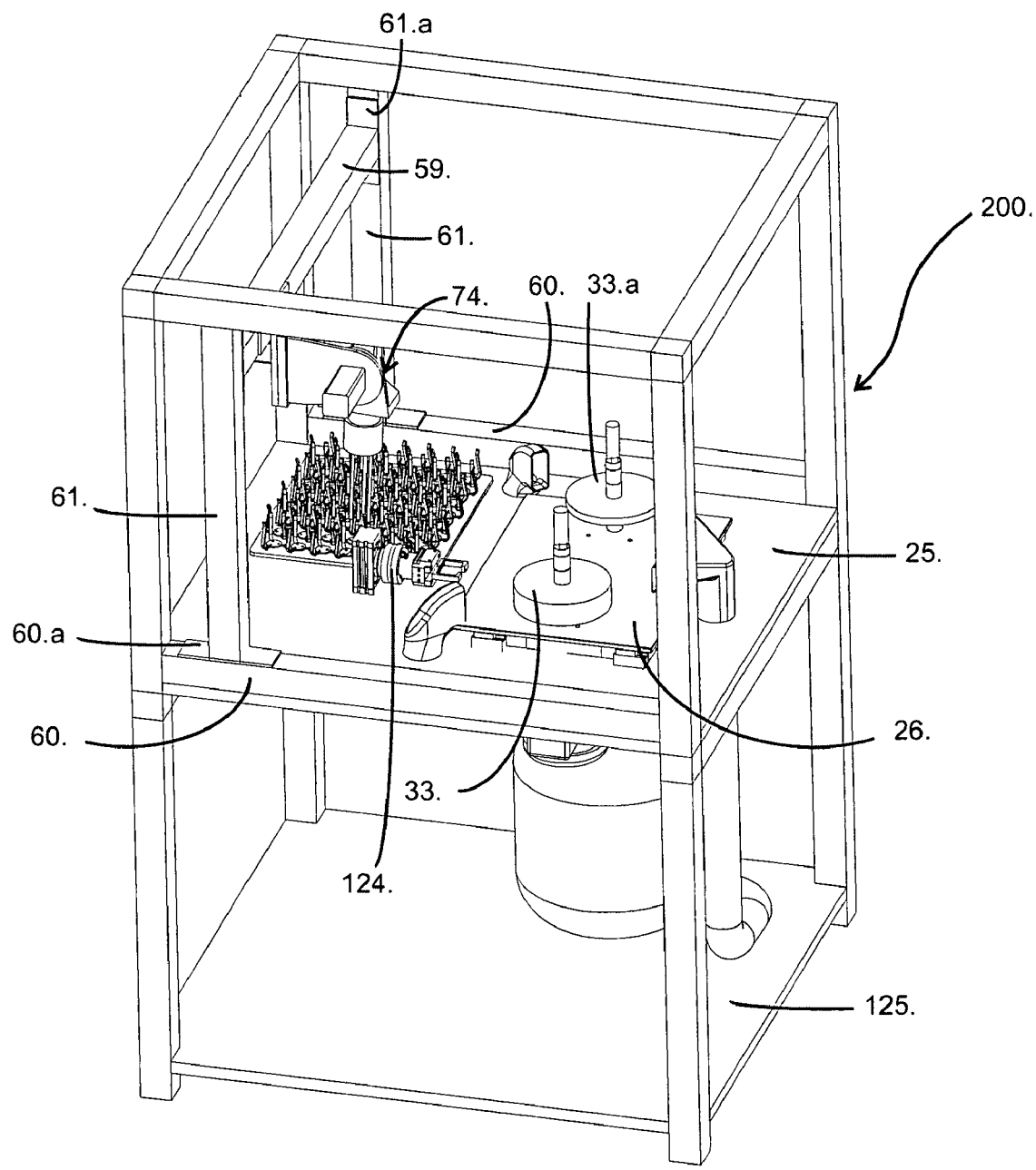
FIG. 16 a perspective view of a processing apparatus using the gimbal unit of FIGS. 1 to 9 with the gripper unit attached as in FIG. 15, the processing apparatus being arranged for a grinding operation, with the outer housing walls removed to reveal the interior of the housing.

FIG. 15 illustrates the gimbal unit of FIGS. 1 to 7 and 9 to 14 with a gripper unit 23 attached to the interface plate 140 via a rotary union 22. The gripper unit 23 in FIG. 15 is designed to hold a piece of jewelry such as a ring 78, but it will be understood that other gripper units designed to hold parts of different shapes may alternatively be mounted on the gimbal unit 74 in a similar manner. The gripper unit 23 and rotary union 22 are described in more detail below in connection with FIGS. 24 to 27.

Although the gimbal unit of this invention may be added to a gantry or robot system as used in any positioning system, the following description describes possible embodiments of a combined gantry and gimbal apparatus as used in a jewelry processing apparatus. However, the combined gantry and gimbal apparatus may be used in other processing systems wherever a part needs to be positioned and oriented at different processing stations.

Figure 32:
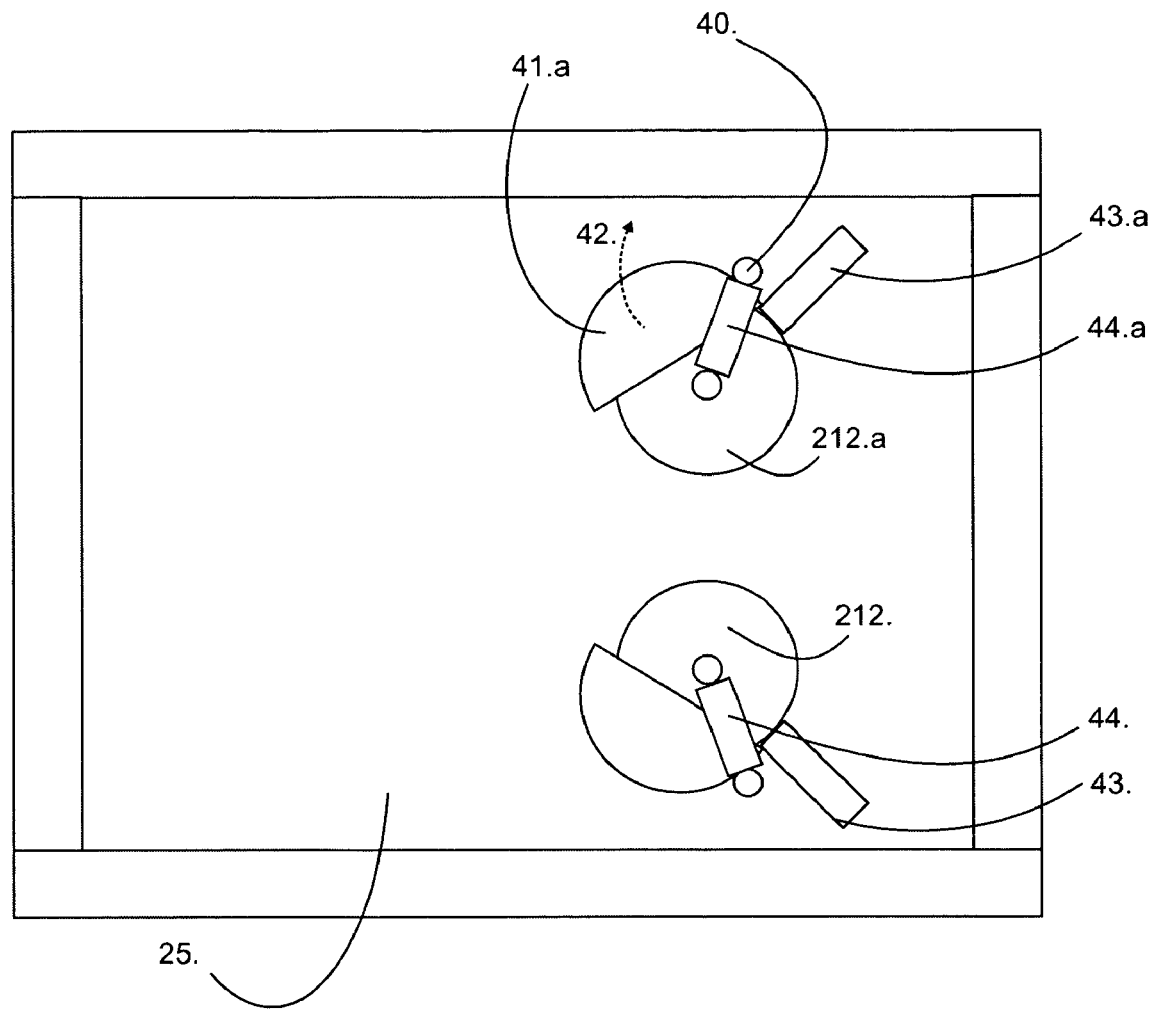
FIG. 32 is a top plan view of part of the tool bed of FIGS. 16 to 19 in which the grinding wheels have been replaced by polishing devices.
Figure 33:
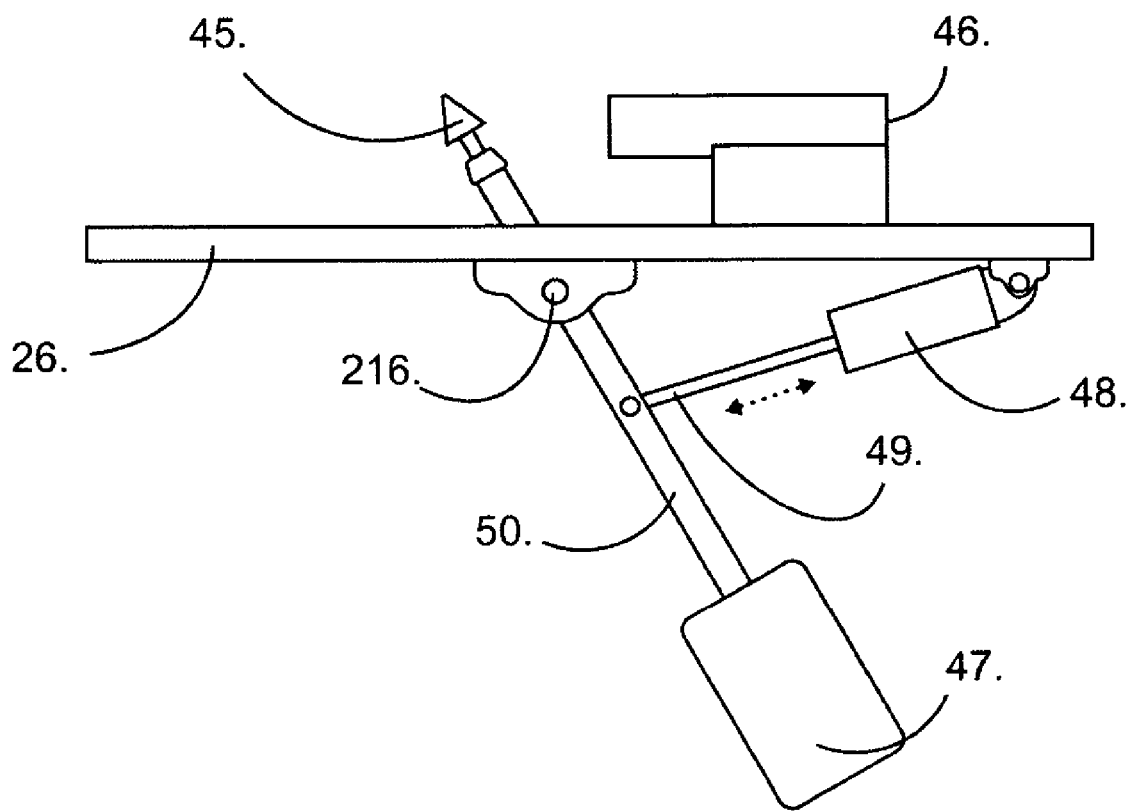
FIG. 33 is a side elevation view of a crown polishing station which may be mounted on the tool bed.
Figure 35:
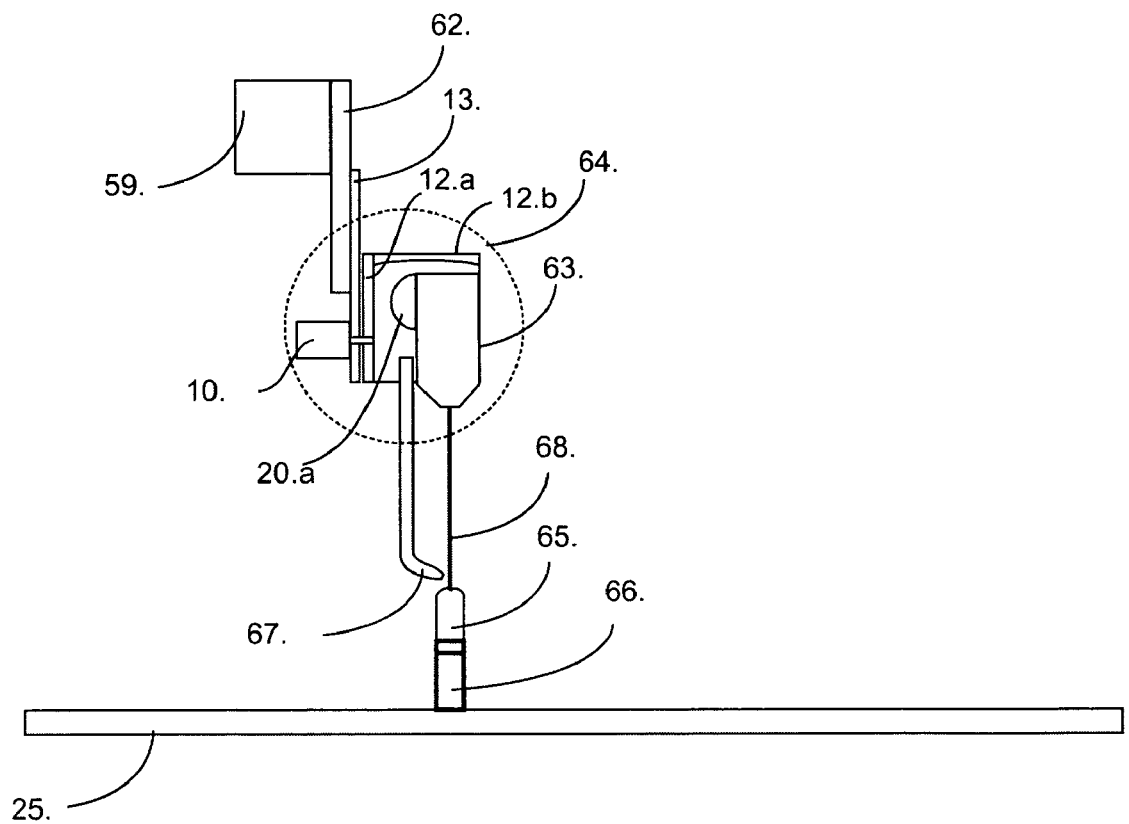
FIG. 35 is a side elevation view of an alternative arrangement of the apparatus of FIGS. 16 to 19 in which a laser deposition unit is mounted on the gimbal unit in place of the work piece.
Figure 36:
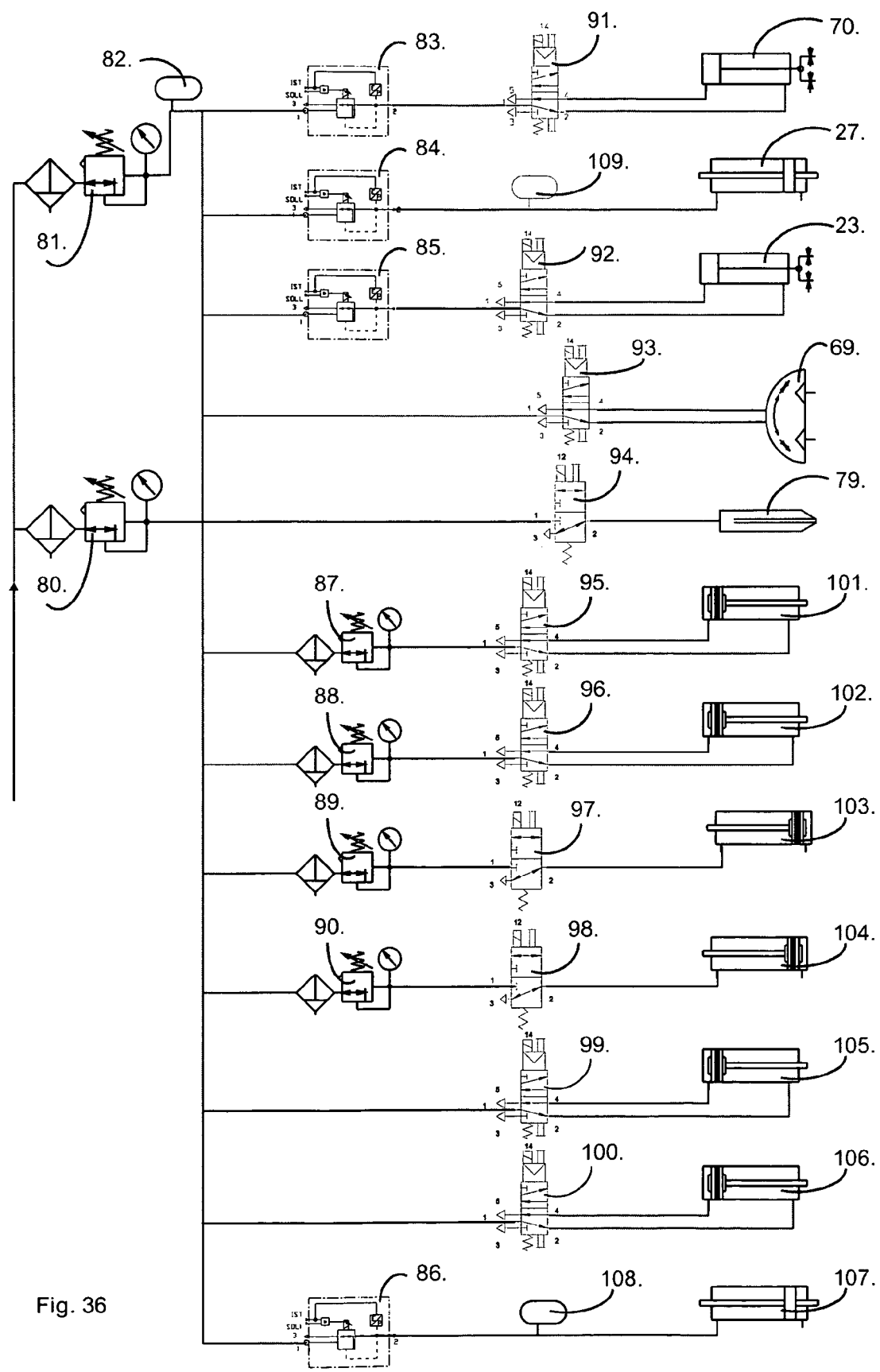
FIG. 36 is a schematic diagram of the pneumatic circuit of the processing apparatus.
Figure 37:
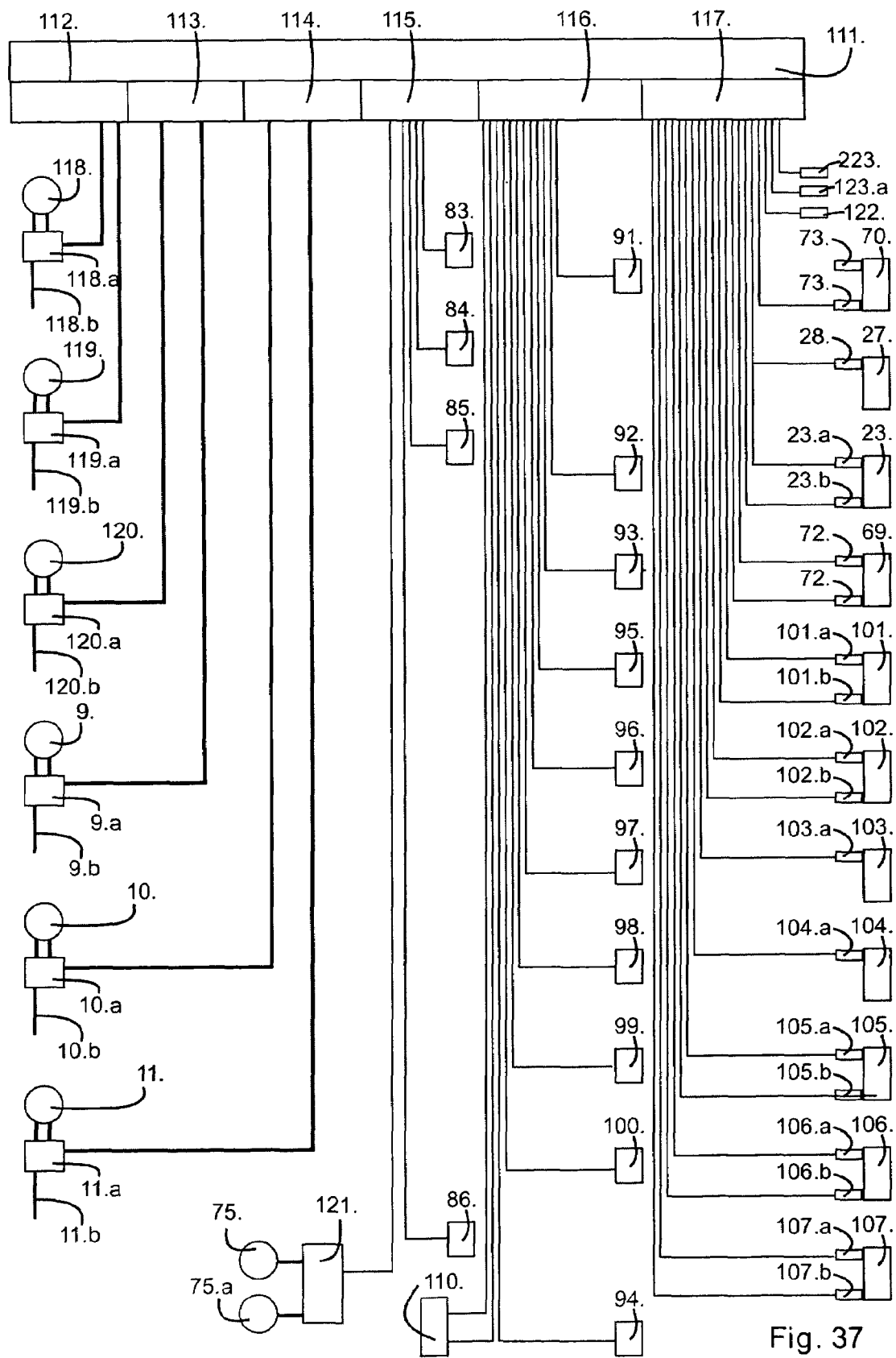
FIG. 37 is a schematic diagram of the control system for the processing apparatus.

FIGS. 16 to 19 illustrate how the gimbal unit 74 of FIGS. 1 to 15 may be mounted on a gantry system to transform the gantry from a 3 DOF system to a 6 DOF system. FIGS. 16 to 19 illustrate a combined gantry and gimbal apparatus according to another aspect of the present invention as used in a jewelry processing system particularly intended for use in jewelry processing applications. In these drawings, the system is arranged for a grinding operation, but it can be readily modified to perform a subsequent polishing operation, as will be discussed in more detail below. FIGS. 20 to 31 illustrate parts of the apparatus of FIGS. 16 to 19 in more detail, while FIGS. 32 and 33 illustrate polishing devices which are interchangeable with the grinding devices of FIGS. 16 to 19, FIG. 34 illustrates an optional steam cleaning station, and FIGS. 36 and 37 schematically illustrate the pneumatic actuator system and control system for the apparatus, respectively. FIG. 35 illustrates the apparatus of FIGS. 16 to 19 with a laser processing unit attached to the gimbal unit in place of the gripper of FIGS. 15 to 19, as will be explained in more detail below.

Although the apparatus is described below in connection with jewelry processing, it will be understood that this apparatus may also be useful in other applications where workpieces need to be transported and precisely positioned in order to undergo processing with different tools at successive work stations. The gripper unit may therefore be designed to hold workpieces of any shape during grinding, polishing, and other processing operations. The apparatus may be used in automation of part manufacture in various industries such as manufacture of aircraft or other vehicle parts, grinding for turbine blade manufacturing, sterilizing of instruments in the medical field, and any other process in which parts have to be transported to and from various processing stations.

The apparatus basically comprises an outer frame 200, a horizontal work plate 25 mounted on the frame with a gantry assembly mounted above the work plate for movement in x, y and z linear directions, and the gimbal unit 74 of FIGS. 1 to 7 and 9 to 15 mounted on the gantry assembly for rotation in perpendicular pitch, roll and yaw directions about the three perpendicular rotary joints. The frame 200 has a pair of horizontal side rails 60 defining a y axis or direction on opposite sides of the work plate. A pair of vertical rails 61 are slidably mounted at their lower ends on the side rails 60 via sliders 60a, and define a z-axis or direction. A horizontal rail 59 is slidably mounted on the vertical rails 61 at its opposite ends via sliders 61a, and defines an x-axis or direction. A slider 59a is slidably mounted on the horizontal, x-axis rail 59 for movement in the x-direction. Linear movement of each slider along the respective x, y and z-direction rails is controlled by a respective linear motor 118, 119 and 120 (see FIG. 37) as will be described in more detail below.

Figure 19:
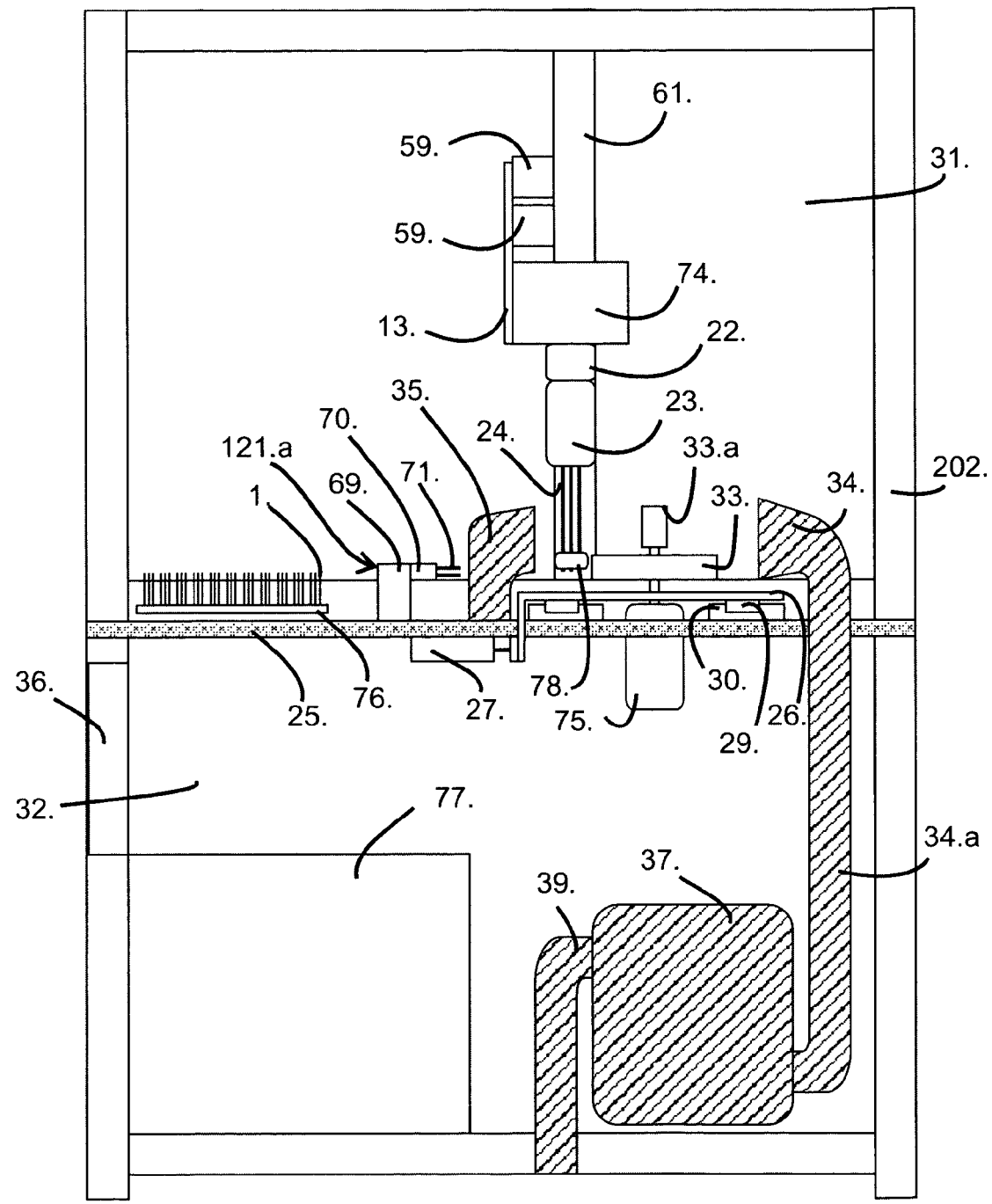
FIG. 19 is a schematic end elevation view of the apparatus of FIGS. 16 to 18 incorporating a metal scrap and dust collection system, with the housing walls in place.

Movement of slider 59a along rail 59 provides adjustment in the x direction. Movement of the rail 59 up and down on the vertical rails 61 adjusts the location of slider 59a in the z-direction, while movement of the rails 61 along the side rails 60 adjusts the location of slider 22 in the y-direction. The frame 200 will be completely enclosed within an outer housing 202 in practice, as illustrated in FIG. 19, so as to prevent escape of metal dust and the like from the housing and also to keep the processing area clean of contaminants. The outer housing is omitted in FIGS. 16 and 17 so that the details of the apparatus are visible. The housing will have an upper wall across the top of the frame and side and end walls across each side and end of the frame. The work plate 25 divides the interior of the housing into an upper chamber 31 and a lower chamber 32, and a bottom plate 125 is provided at the lower end of the housing. The housing will be provided with one or more access doors and may have windows for observation of the workpiece processing as it is carried out within the work chamber. An enclosure 77 for the electronic and pneumatic control systems is seated on the bottom plate 125, as indicated in FIG. 19.

Figure 17:
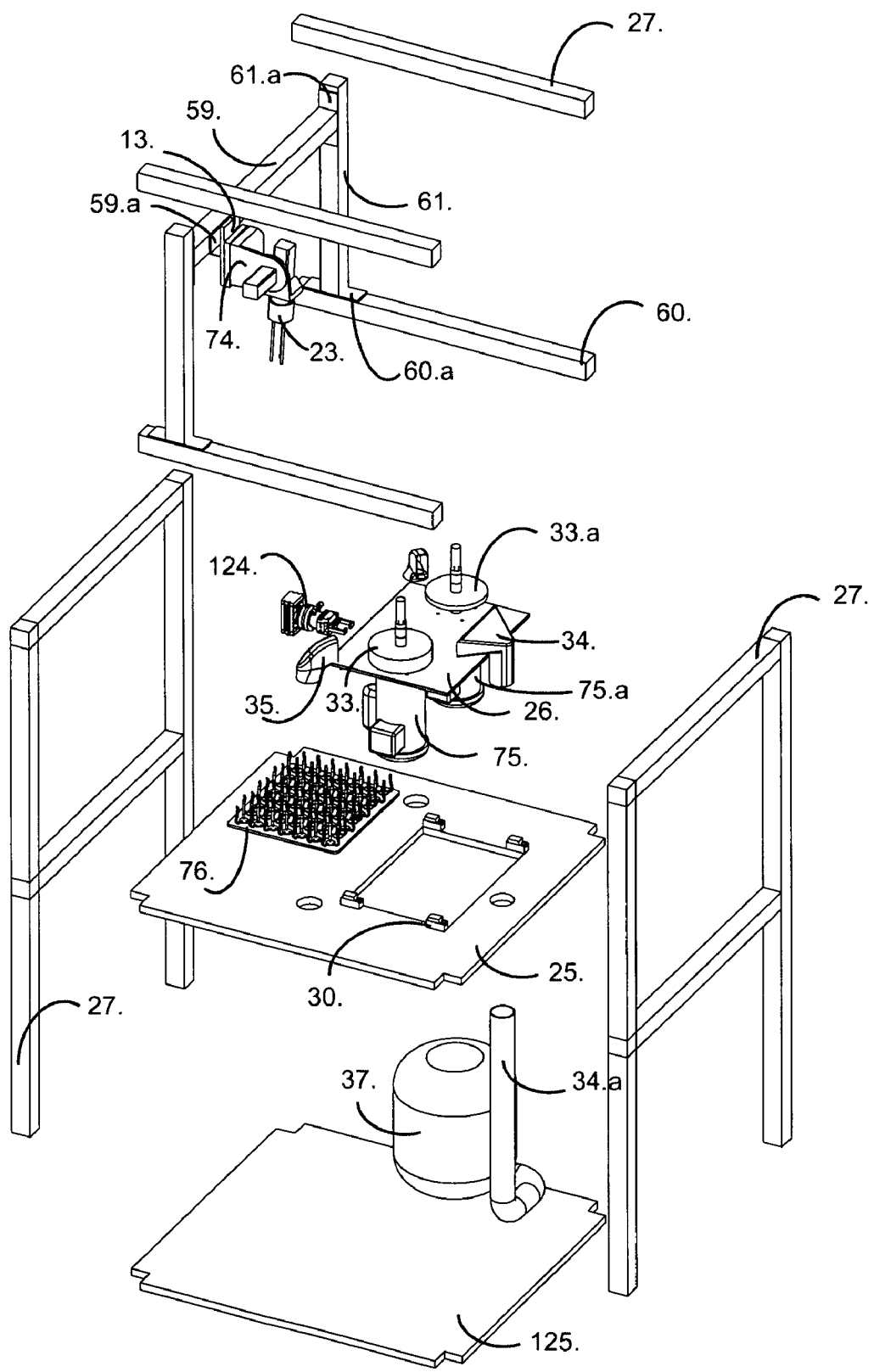
FIG. 17 is an exploded view of the parts of the processing apparatus of FIG. 16, again excluding the housing walls.
Figure 18:
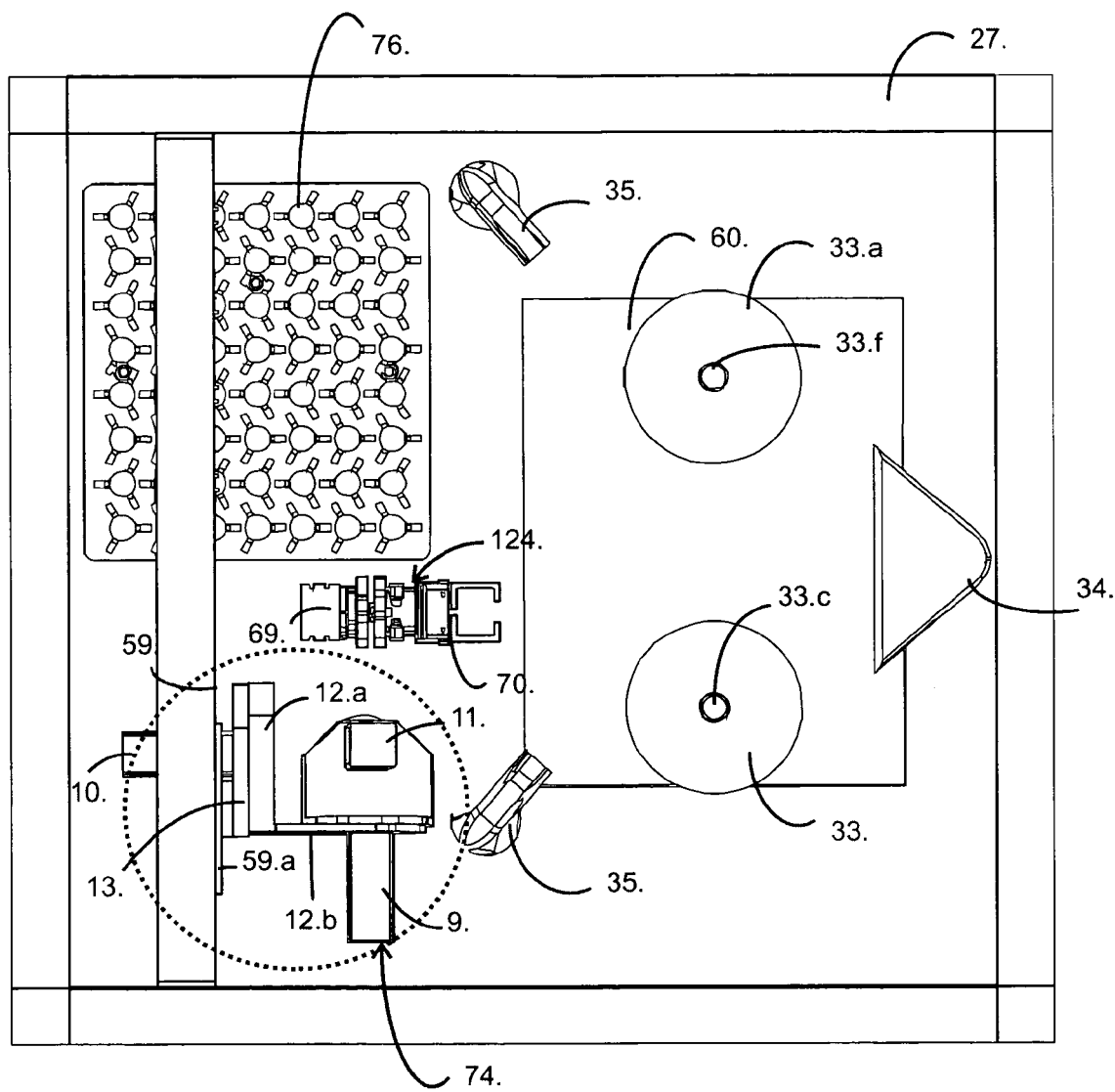
FIG. 18 is a top plan view of the apparatus of FIGS. 16 and 17.

The yaw plate 13 of the gimbal or three degree of freedom (3 DOF) rotary unit 74 of FIGS. 1 to 15 is mounted on slider or x-axis carriage 59a via bolts or the like extending through mounting holes 264, as best illustrated in FIGS. 17 and 18. The gripper unit 23 is mounted on the mounting plate 140 of the gimbal unit 74 via a rotary union 22, as indicated in FIG. 15 and schematically in FIGS. 17 and 18. The gripper unit 23 is designed to hold a piece of jewelry or any work piece to be processed, and the combined gripper unit and rotary union is illustrated in more detail in FIGS. 24 to 27.

Figure 24:
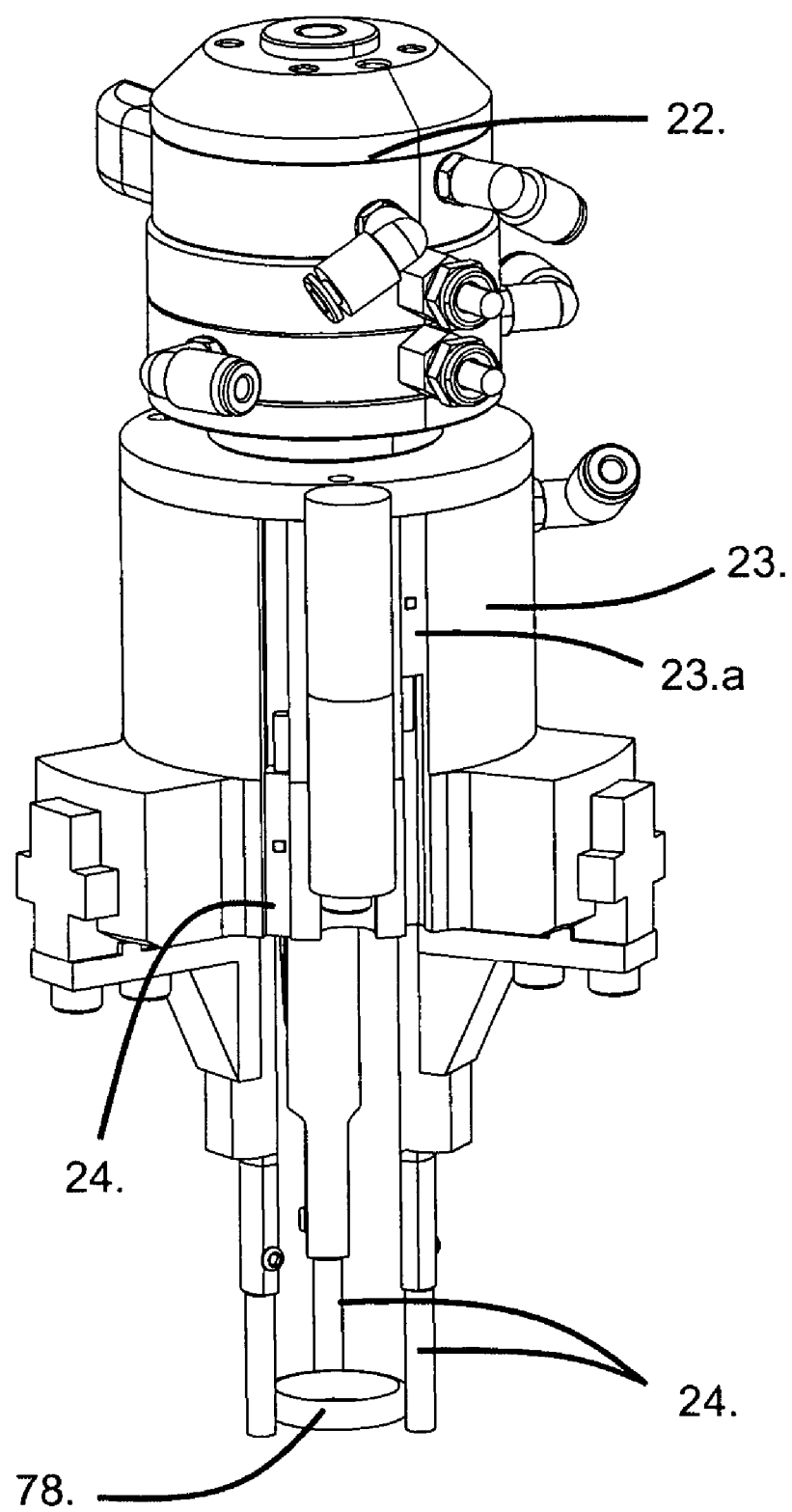
FIG. 24 is a perspective view of the gripper unit of FIGS. 15 to 19 separate from the gimbal unit.
Figure 25B:
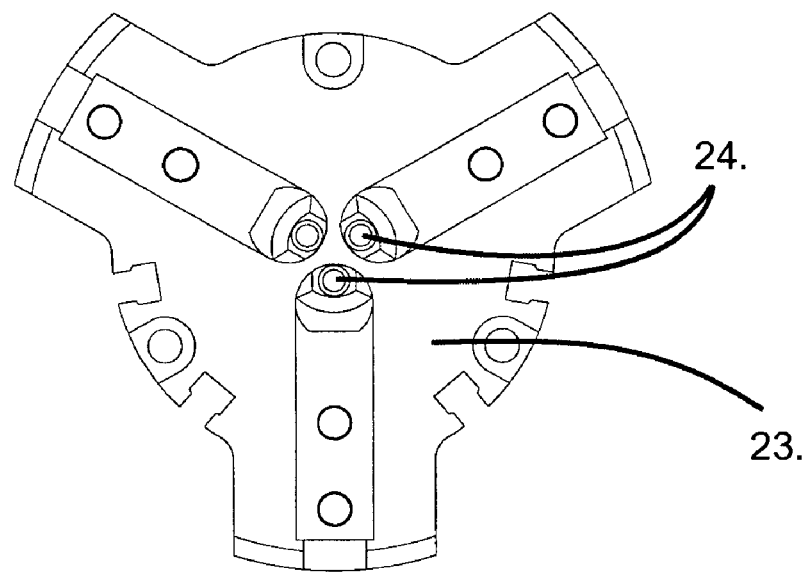
FIG. 25b is a view similar to FIG. 25a illustrating the gripper fingers in an outer position.
Figure 25B:
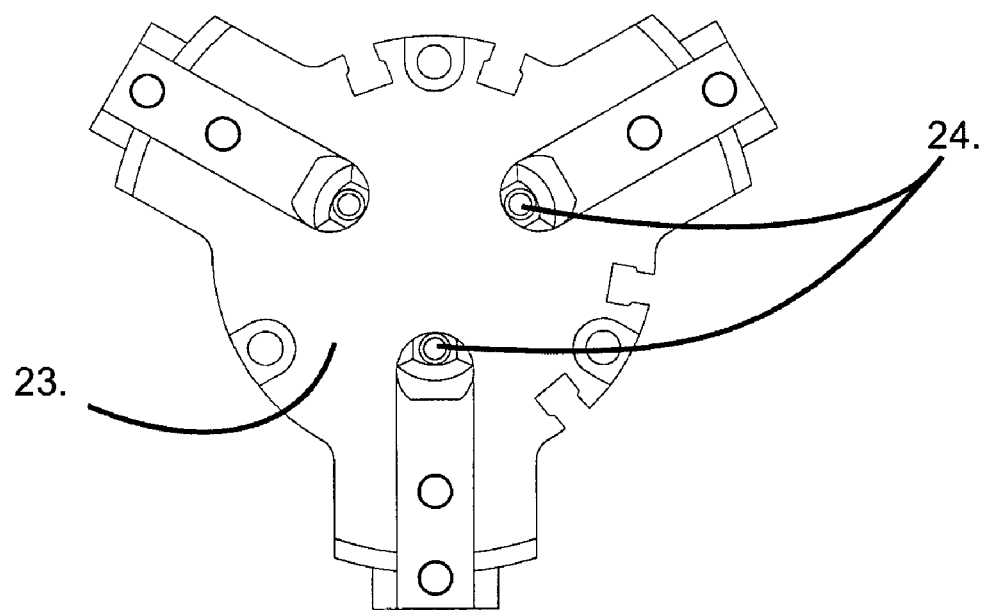

Both the gantry and the gripper unit may be off the shelf items while the gimbal unit is custom made for this application. The gantry in the exemplary embodiment is a 3 DOF gantry system as made by Parker Hannifin Corporation, Electromechanical Components and Systems Division, of Wadsworth, Ohio (www.parker.com), but any similar gantry system as made by other companies may alternatively be used. The gimbal unit of this invention is simply mounted on the x-direction slider of this gantry system using standard mechanical fasteners such as screws or bolts. The gripper unit 23 is secured to the coupling plate 140 of the gimbal unit 74 via an off-the-shelf rotary union 22 manufactured by Schunk Intec Inc of Morrisville, N.C. The gripper unit is a three finger gripper manufactured by SMC Corporation of Indianapolis, Ind. such as the SMC-MHSL3-50D-Y59BL or the like. The gripper has a pneumatic actuator and a set of three custom-made fingers 24 moved back and forth by the actuator. Sensors 23a and 23b (FIG. 24) are provided to monitor the gripper finger position. FIG. 25a illustrates the fingers 24 in the inner or closed position, as would be used for gripping the inner surface of a ring, for example. FIG. 25b illustrates the fingers 24 in the outer or open position, as would be used for gripping the outer surface of a ring. FIGS. 15 and 24 illustrate the fingers holding a ring 78 in this position.

Figure 27A:
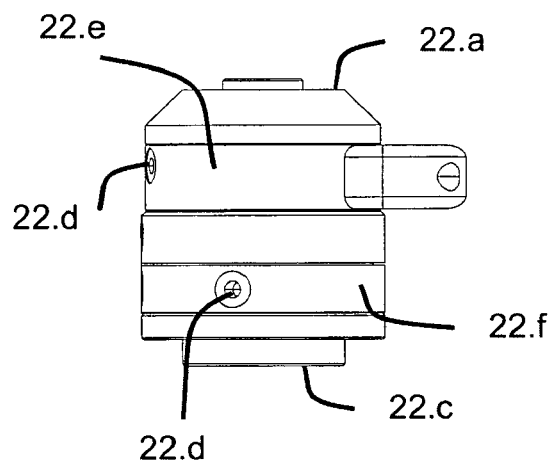
FIG. 27a is a side elevation view of the rotary union for connecting the gripper unit to the gimbal unit.
Figure 27B:
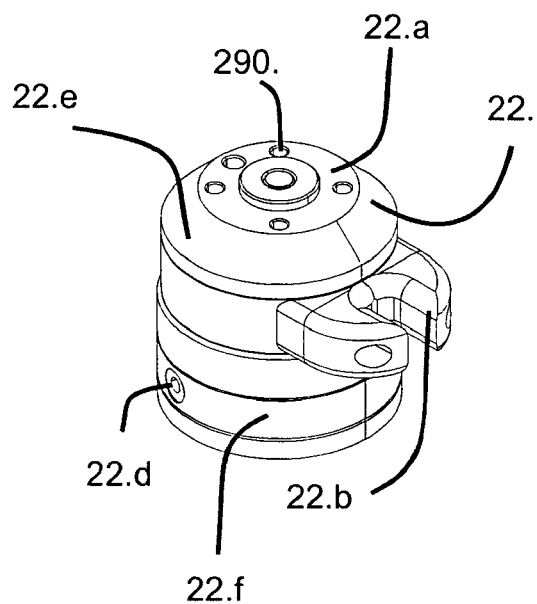
FIG. 27b is a perspective view of the rotary union.
Figure 27C:
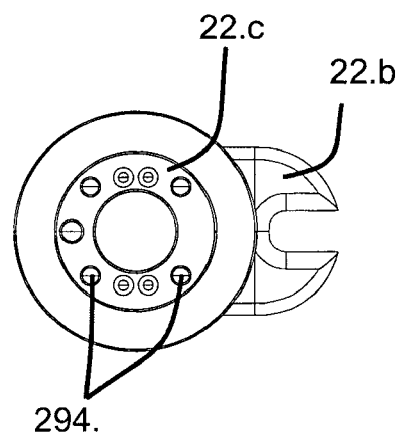
FIG. 27c is a top plan view of the rotary union.
Figure 26:
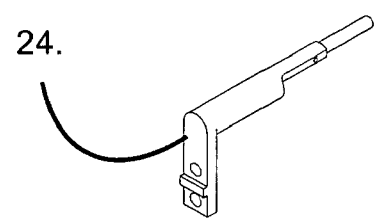
FIG. 26 is a perspective view of one of the gripper fingers of the unit of FIGS. 24 and 25.

The rotary union 22 is illustrated in more detail in FIGS. 27a to 27c. The rotary union 22 has a stationary or static upper part 22e and a rotating lower part 22f. A portion of the rotating lower part 22f projects upwardly through the static upper part and has an upper surface 22a at the top of upper part 22e, as illustrated in FIG. 27b. The upper surface 22a of the rotating part of the union 22 has mounting screw holes 290 for interface with corresponding holes on the end face of the mounting plate 140 of the gimbal unit. An anchor assembly 22b projects to one side of the static part 22e of the rotary union or connector 22 for connection to torque arm 262 of the gimbal unit so as to anchor the upper part of the rotary union to the gimbal unit, as best illustrated in FIG. 15. As illustrated in FIG. 27c, the lower surface 22c of the union also has mounting screw holes 294 for interface with corresponding mounting holes at the upper end of the gripper unit. A hole 22d is provided for mounting of a pneumatic connector. The function of the rotary union 22 is to allow pneumatic and electrical wiring connections to be made to the gripper unit while avoiding torsional tangling of the tubing and wiring due to rotation of the gripper unit.

The three finger gripper of FIG. 24 is one example of a suitable gripper for handling rings. It will be understood that different types of gripper may be used for handling different parts or different types of jewelry for processing, and the grippers may be interchangeably mounted on the gripper unit.

Figure 20:
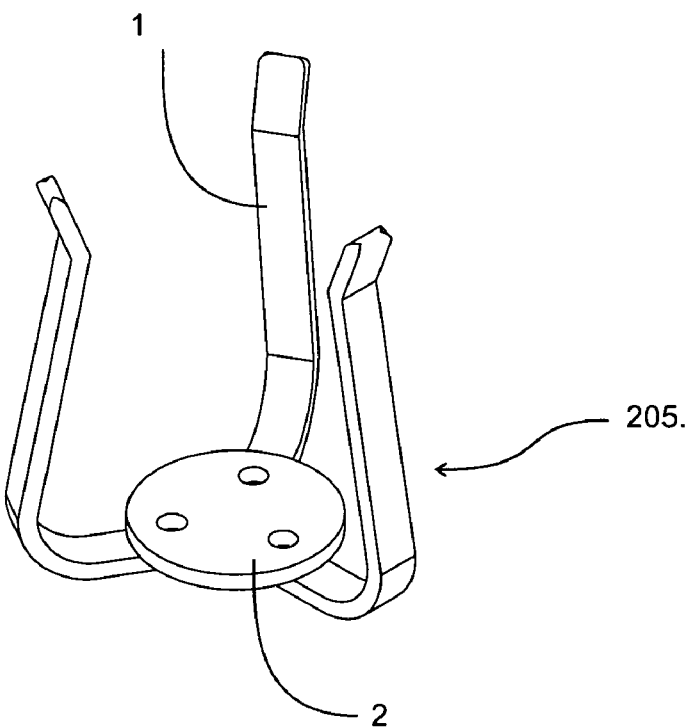
FIG. 20 is a perspective view of a prong unit suitable for holding rings on a storage tray in the apparatus prior to or after processing on the apparatus.
Figure 21:
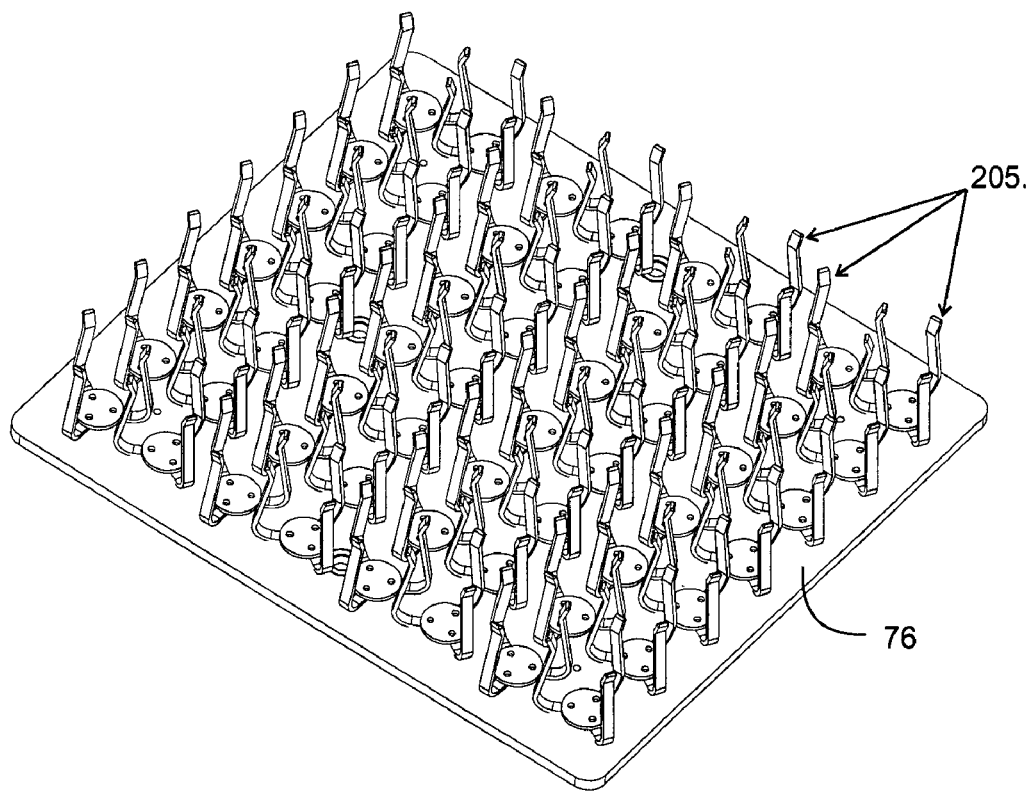
FIG. 21 is a top perspective view of a holder tray having a plurality of the prong units of FIG. 20.
Figure 22:
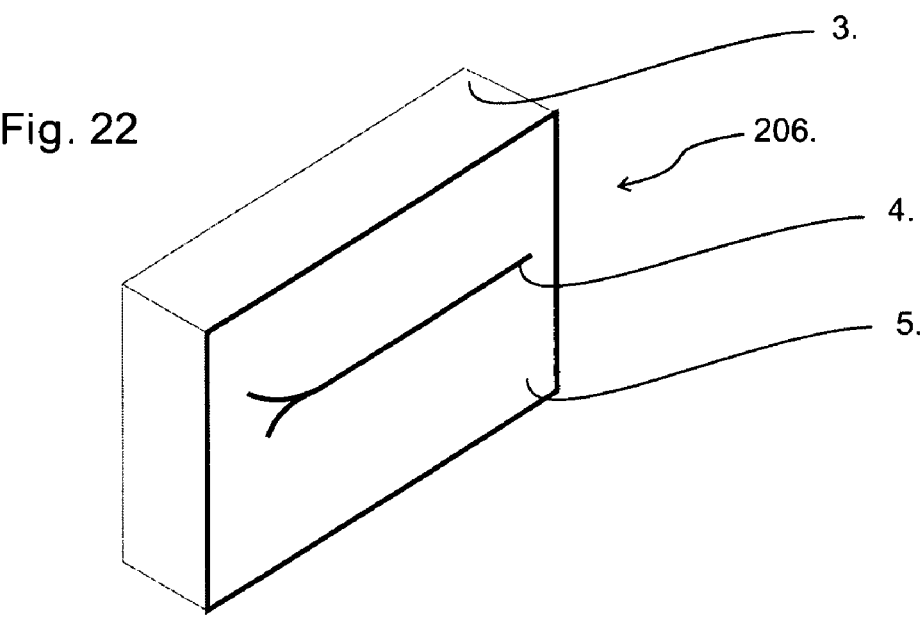
FIG. 22 is a perspective view of a holder device for holding a flat part to be processed.
Figure 23:
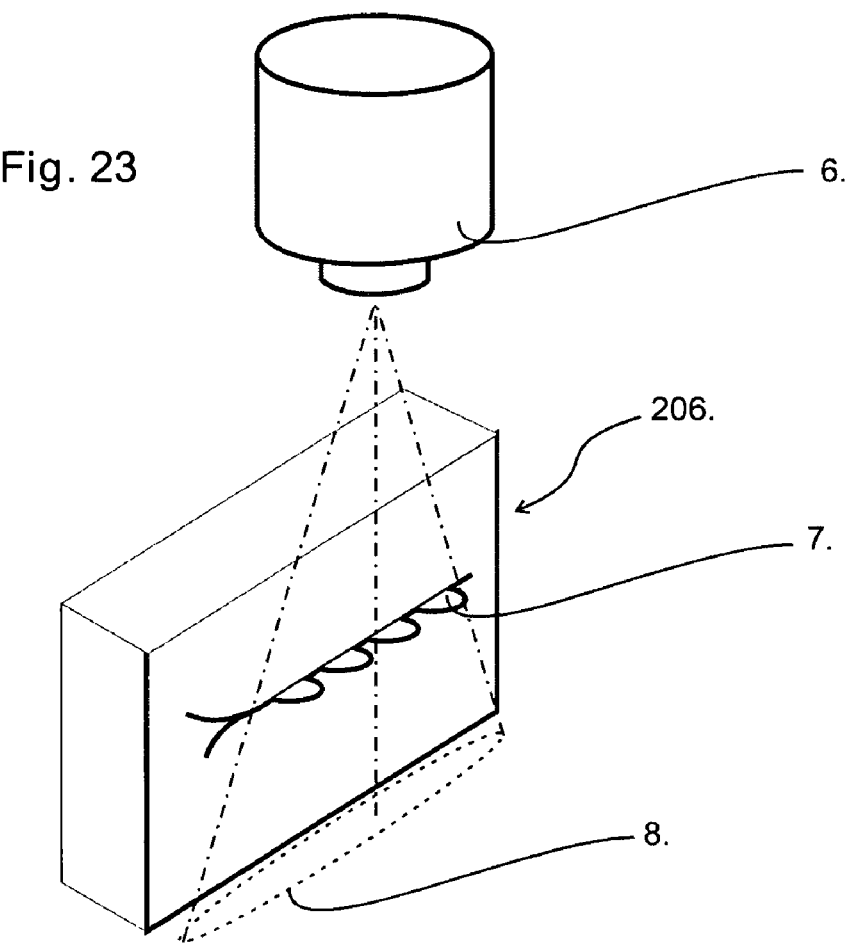
FIG. 23 is a perspective view similar to FIG. 22 illustrating parts held in the holder device and a camera for viewing the parts.

In addition to the gimbal unit and attached gripper, one or more product storage trays 76 will be mounted in the housing on the work table or plate 25 for holding product to be processed or at an intermediate point in processing, as well as finished product prior to removal from the machine. The trays may have suitable holders for holding individual workpieces, or may simply have a soft pad on which finished pieces can be placed. FIG. 20 illustrates a suitable three finger holder 205 for a ring, while FIG. 21 illustrates a plurality of the holders 205 on a tray 76. FIGS. 22 and 23 illustrate a suitable holder 206 for flat items 7 to be processed, such as a flat or relatively flat piece of jewelry. FIGS. 16 to 19 illustrate a storage tray 76 having a plurality of ring holders 205 mounted on the work plate 25. It will be understood that additional trays may be located on the work plate if required, and the dimensions of the work plate may be increased if necessary to accommodate such trays, which may be designed to hold rings, other types of jewelry, or different types of workpieces.

The ring holder 205 has a base 2 with holes for securing the holder to a tray with suitable fasteners such as screws, and a series of three flexible fingers or prongs 1 projecting upwardly from the base. A ring will be held in the indented region of the fingers until removed by gripper unit 23. The holder 206 of FIGS. 22 and 23 comprises a piece 5 of foam or rubber held in an outer box or container 3 which is open on a front face. The rubber or foam piece 5 has a slit 4 cut in its front face, and a plurality of flat pieces 7 may be inserted in the slit so that part of each piece projects outwardly for picking up by the gripper unit. A camera or monitor 6 is provided for monitoring the positions of parts held in the holder 206, as illustrated in FIG. 23. Instead of a slit for holding flat parts, a cut-out may be made in the rubber piece for following the contour of a more complex jewelry piece so as to hold the piece until it is picked up for processing.

Figure 28:
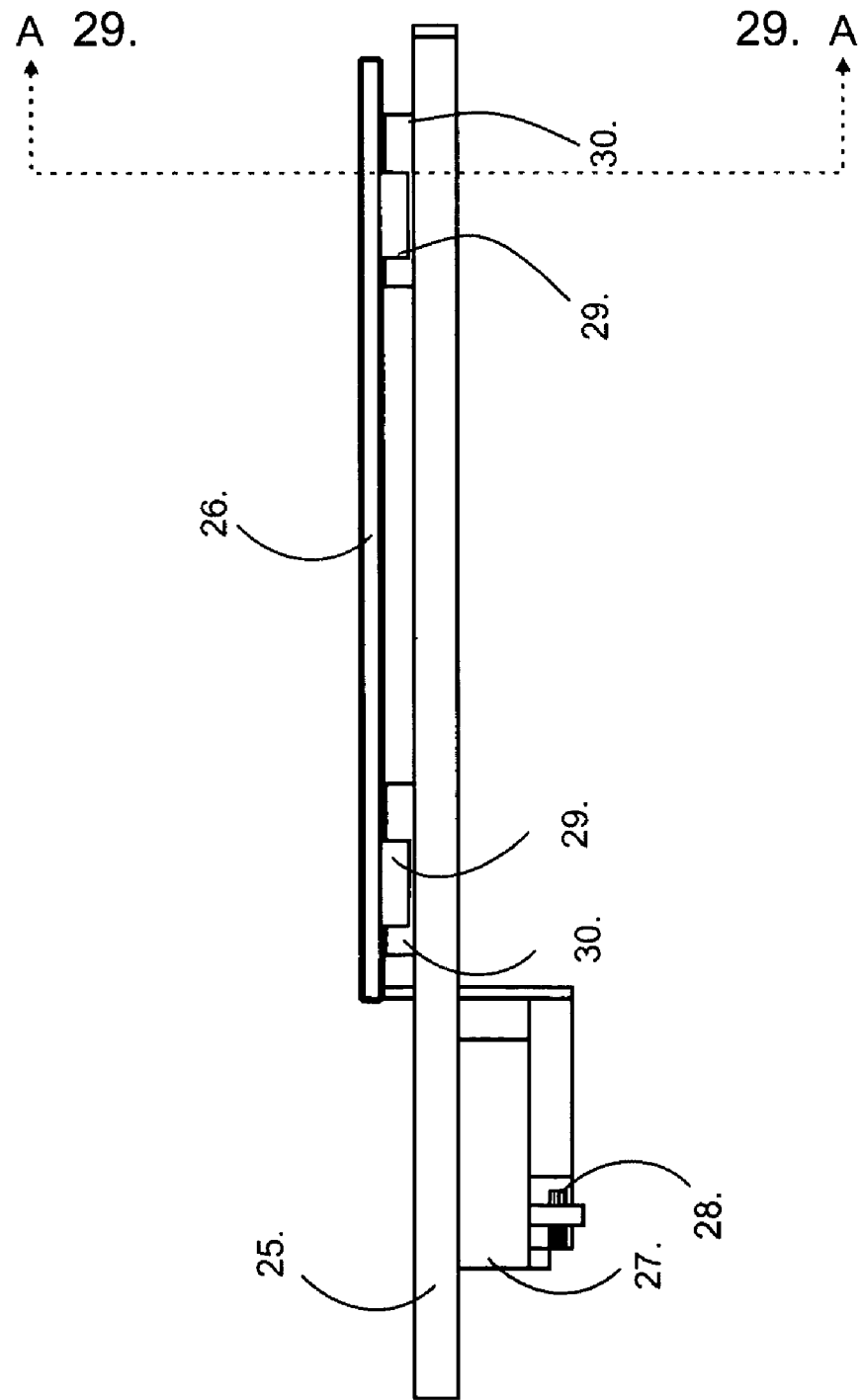
FIG. 28 is a vertical cross-sectional view through the work plate of the apparatus of FIG. 16, illustrating a slidable tool bed mounted on the work plate.
Figure 29:
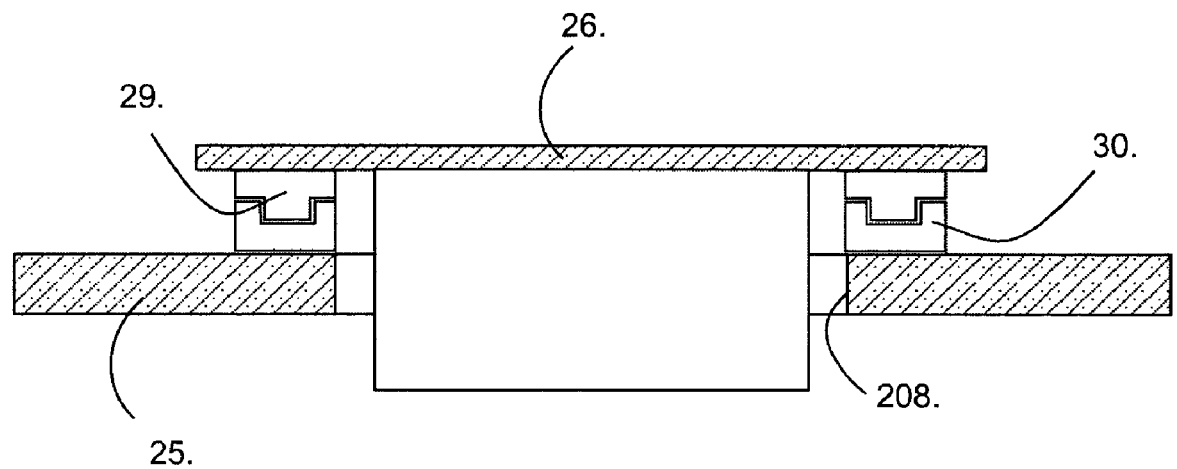
FIG. 29 is a cross section on the lines 29-29 of FIG. 28.
Figure 30:
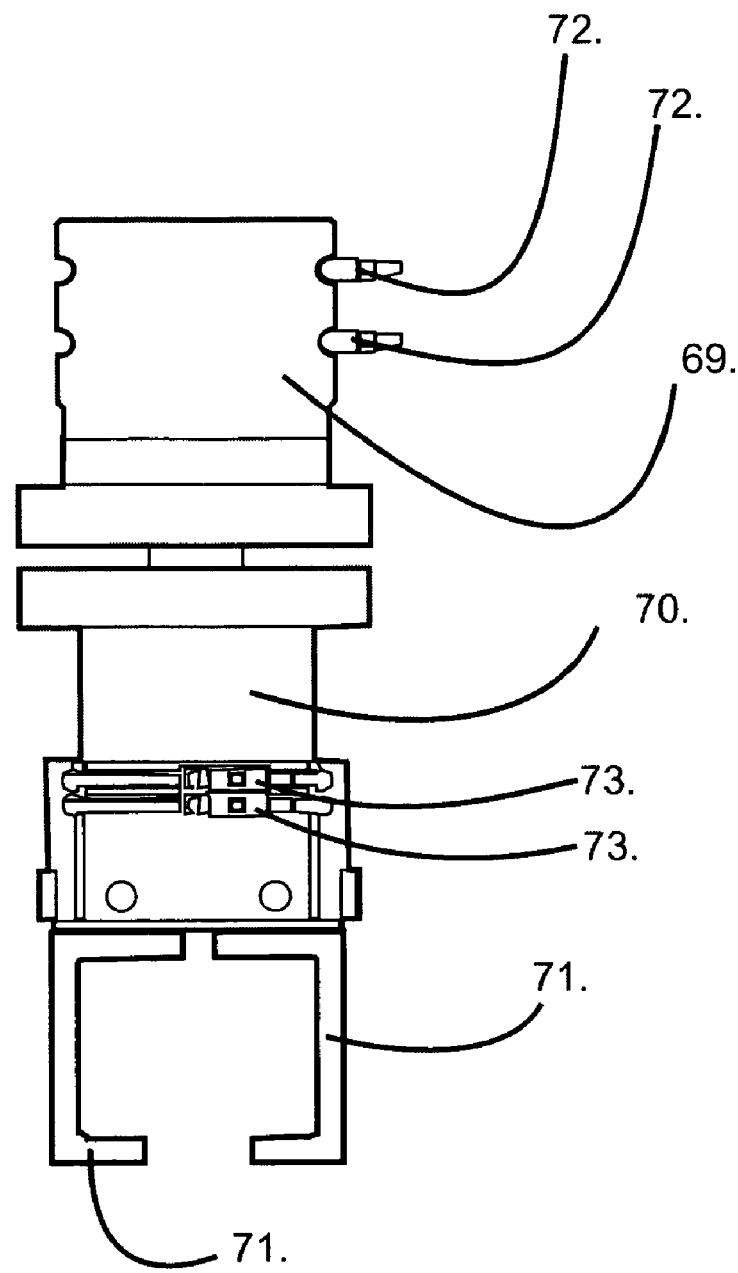
FIG. 30 is a side elevation view of a flip station.

As illustrated in FIGS. 16 to 19, 28 and 29, a tool bed 26 is slidably mounted on the work plate 25 via spaced slide rails 30 on the work plate which are engaged by spaced sliders or carriages 29 on the lower face of the tool bed. The tool bed is suitably mounted over an opening 208 in the work plate 25, as best illustrated in FIGS. 17 and 29, and the slide rails 30 are mounted on opposite sides of the opening. The tool bed is used for mounting of tools for performing tasks which benefit from a variable application force, such as grinding and polishing wheels. Other tools can be mounted on the stationary work plate. As illustrated in FIG. 28, a drive device comprising a standard low friction pneumatic slide cylinder 27, such as the SMC-CXSL10-10-Z73L manufactured by SMC Corporation, is mounted beneath the work plate and linked to the tool bed to drive it back and forth along the slide rails, and a sensor 28 is associated with the slide cylinder for detecting movement of the tool bed.

A series of processing tools defining work stations can be mounted on the work table and on the tool bed, depending on the type of processing to be carried out. The grinding and polishing tools and the re-gripping or flipping tool used in this apparatus are substantially the same as conventionally used in manual or robotic jewelry processing, but they are mounted, addressed by the workpiece, and controlled in a completely different manner. The typical tools required for processing jewelry are grinding wheels and polishing wheels, and these will be selectively mounted on the tool bed 26. The apparatus may be set up either for grinding or for polishing, using the same drive motors and wheel mounts for either operation. In practice, a plurality of workpieces, for example rings, are taken through a two or more stage grinding operation, then returned to a storage tray. Once the grinding operation has been completed on all of the rings, the grinding wheels are replaced with polishing tools, and each ring in turn is taken through the polishing operation. As noted above, FIGS. 16 to 19 illustrate the apparatus set up for a grinding process.

Figure 31:
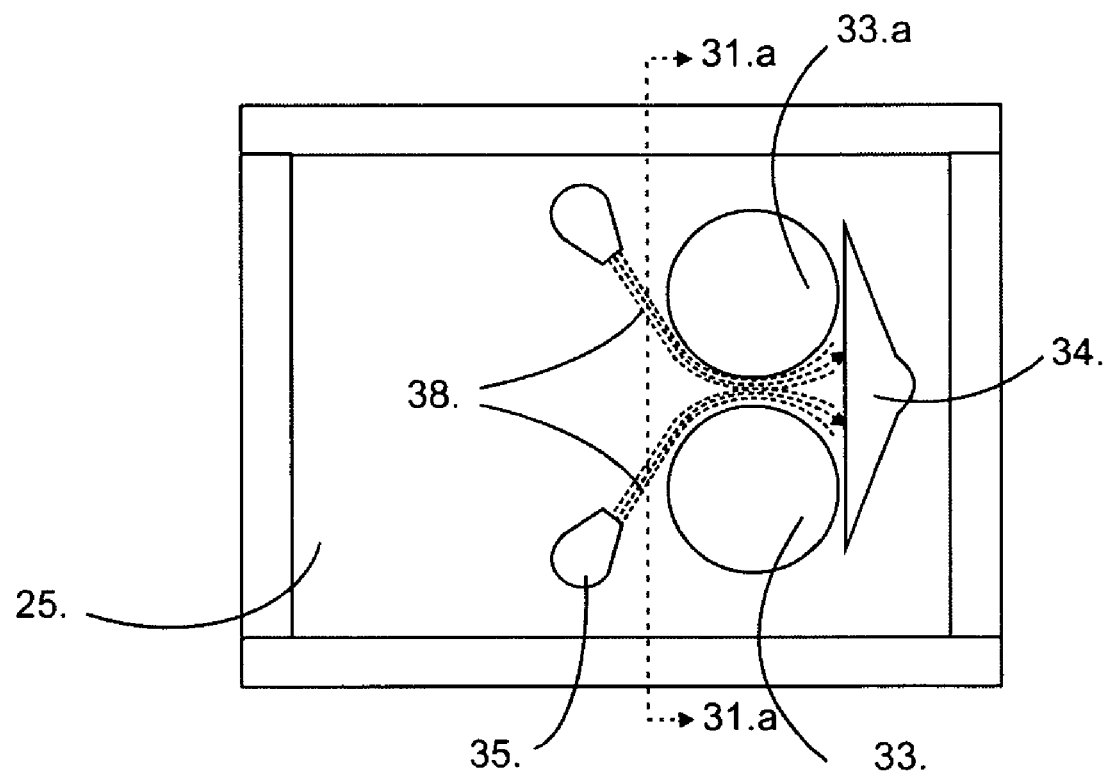
FIG. 31 is a top plan view of a grinding station in the apparatus with the associated dust collection arrangement.
Figure 31A:
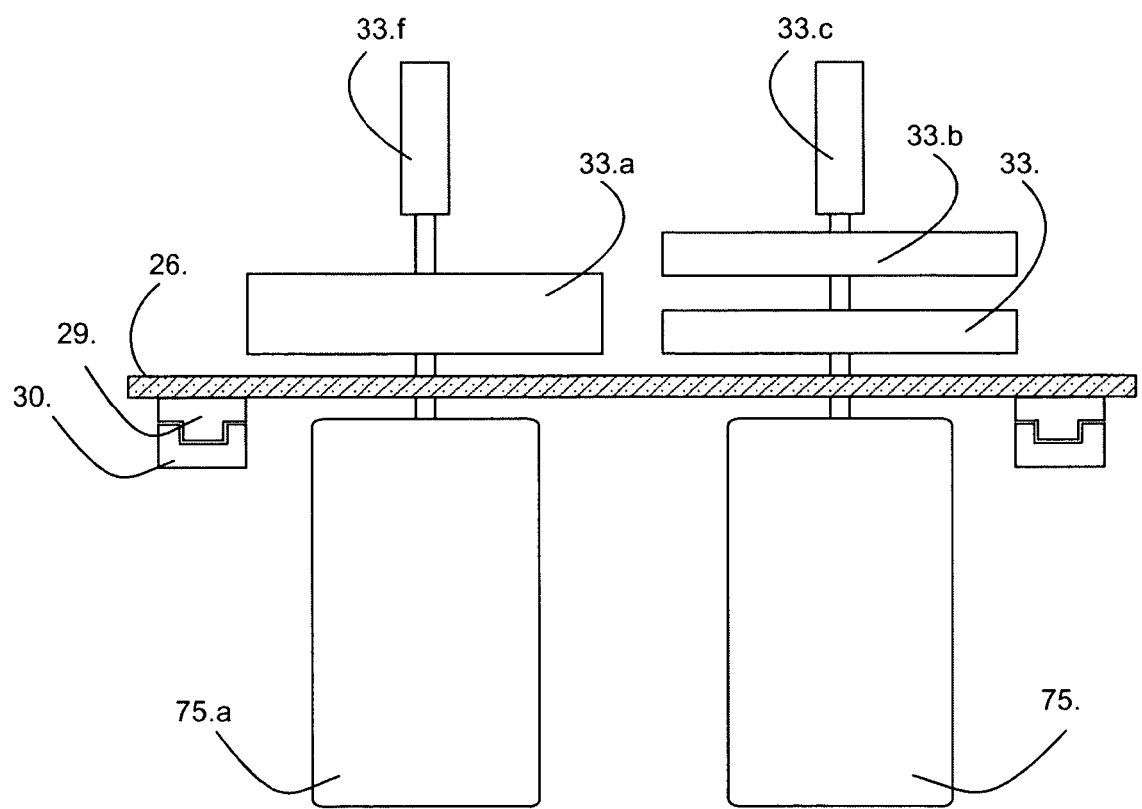
FIG. 31a is a cross-sectional view on the lines 31a-31a of FIG. 31, illustrating an optional grinding wheel configuration.

FIGS. 16 to 19 and 31 illustrate a pair of grinding wheels 33, 33a rotatably mounted on the tool bed 26 via axles which are driven by respective drive motors 75, 75a located beneath the opening in the work plate. In practice, a series of grinding stations will be provided in sequence along the tool bed, such as rough or sprue removal wheels, contour grinding wheels, and finally fine grinding wheels. Each grinding wheel may have a larger diameter lower grinding wheel for outside processing and a smaller diameter upper grinding wheel for inside diameter grinding, such as on the inside surface of a ring, as is known in the field. FIG. 31a illustrates one optional grinding wheel arrangement. In this arrangement, a first grinding station has a first disk 33 for outside, contour grinding, a second disk 33b for outside fine grinding or pre-polishing and a third disk 33c of smaller diameter for inside fine grinding. A second grinding station has a first disk 33a which comprises a lapping wheel of rubber with a sandpaper cover and a second, smaller diameter disk 33f for inside rough grinding. The user may adopt different grinding wheel configurations based on processing requirements.

Also illustrated in FIGS. 16 to 19 and 31 is a metal scrap collection system which will be associated with any grinding or polishing tool so as to allow any precious metal fragments or dust to be collected. The lower chamber 32 of the outer housing has a standard air filter inlet 36 (see FIG. 19). An air collector head 34 is mounted on the work plate so as to face the grinding wheels 33 and is connected via duct 34a extending through the work plate 25 to a filter unit 37 comprising a water filter with a vacuum motor. The water filter has an outlet connected via duct 39 to an air outlet from the housing. A pair of air nozzles or blowers 35 face the grinding wheels 33 on the opposite side of the wheels to the air collector head, and communicate through openings in the work plate to the lower chamber 32 beneath the work plate. The blowers 35 will draw in air through inlet filter 36 and blow air across and between the grinding wheels, as indicated at 38 in FIG. 31. The air will be sucked into air collector head 34 along with any metal dust or particles created in the grinding operation. The mixture of air and metal dust will be conveyed to water filter 37 where any metal dust or particles will be extracted and retained for future recovery, while the air will be vented out through outlet of duct 39.

FIG. 19 illustrates how a part such as a ring 78 will be held by the three finger gripper 24 against a grinding wheel 33. At the same time, the tool bed slider pneumatic actuator or cylinder may be controlled in order to adjust the material removal force, by moving the grinding wheel towards or away from the ring or other workpiece. Software is used to record the position of the slider when the ring contacts the grinding wheel.

A flip station 124 is mounted on the stationary work plate adjacent the slidable tool bed 26, as illustrated in FIGS. 16 to 19. The flip station has a flip tool for changing the position of a workpiece on the gripper unit so that a different part of the workpiece can undergo the grinding operation. The flip tool is illustrated in more detail in FIG. 30, and comprises a flip motor 69 (a pneumatic rotary cylinder in the illustrated embodiment) and a two finger gripper unit 70 having a pair of fingers 71 driven by motor 69. Flip motor sensors 72 are associated with the motor 69, and flip gripper sensors 73 are associated with the flip gripper fingers 71. The flip station in the exemplary embodiment is a flip motor or pneumatic rotary cylinder manufactured by SMC Corporation of Indianapolis, Ind. (SMC-MSQB10A-A90VL) and a two finger gripper also manufactured by SMC Corporation (SMC-MDHR2-20R-F9BVL). Such flip stations are used in jewelry processing machines using robots to move work pieces from work station to work station.

As noted above, the processing apparatus is shown in FIGS. 16 to 19 in an arrangement for grinding a workpiece such as a ring or other item of jewelry, or any part requiring grinding for sprue removal and surface finishing. After a grinding operation is complete, the apparatus may be readily modified to remove the grind wheels 33, 33a and replace them with polishing tools, such as the polishing wheels 212, 212a illustrated in FIG. 32. The tools 212, 212a can be easily mounted on the axles of motors 75, 75a in place of the grinding wheels 33, 33a. The polishing wheels 212, 212a are conventional jewelry polishing tools and each have at least a lower wheel and an upper wheel mounted on respective axles, a lower rouge applicator 43, 43a associated with lower wheel, an upper rouge applicator 44, 44a associated with upper wheel, and a dust shield 41, 41a mounted for rotation in the direction of arrow 42 about axis 40. When not in use, the shield 41, 41a is rotated out of the way, together with the upper rouge applicator 44, 44a.

Figure 32A:
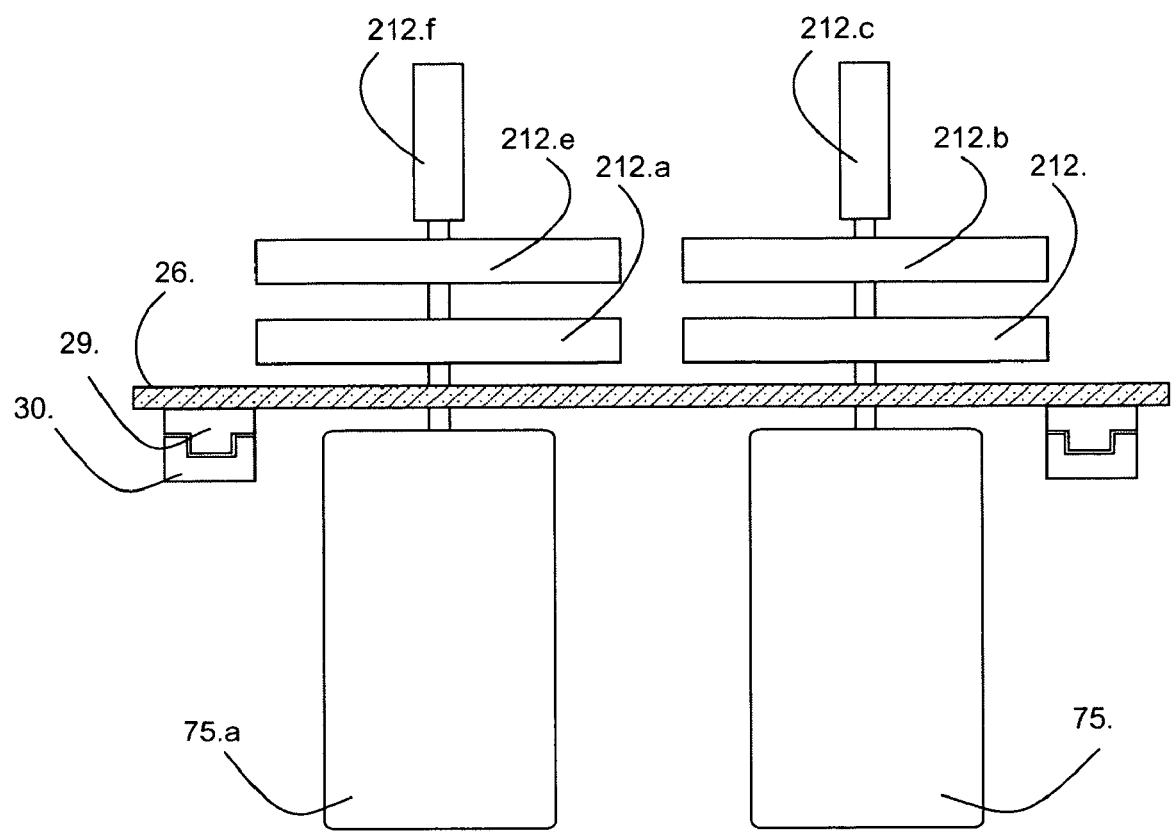
FIG. 32a is a side view similar to FIG. 31a but illustrating an optional polishing wheel configuration

FIG. 32a illustrates an exemplary polishing wheel arrangement in which three polishing wheels or disks are provided on each axle. The first polishing station has a first disk 212 which is for outside polishing and may be a muslin wheel for fine polishing; a second disk, 212b, which is a bristle wheel for outside rough polishing, and a third disk, 212c, which is a smaller diameter bristle wheel for inside rough polishing. The second polishing station has a first disk, 212a, which is also a muslin wheel for outside fine polishing, a second disk, 212e, which is a bristle wheel for outside rough polishing, and a third, smaller diameter disk, 212f, which is a felt bob wheel for inside fine polishing. Other polishing wheel configurations may be adopted as required.

FIG. 33 illustrates an optional crown polishing station which may be mounted on the work plate 25 for use with jewelry having a crown. The crown polishing station comprises a crown polishing tool 45 which has a tool head mounted on carrier shaft 50 extending through the workplate and pivotally mounted on pivot 216. The shaft 50 is extended and retracted by motor 47 in order to adjust the height of the tool head above the workplate, while the angle of the tool head is adjusted by pneumatic cylinder 48 which controls extension of link bar 49 which is pivotally secured to the shaft 50. Extension of bar 49 will pivot the shaft about pivot 216 in a clockwise direction, while retraction of the bar will pivot the shaft back in an anti-clockwise direction. A rouge applicator 46 is associated with the crown polishing station.

Figure 34:
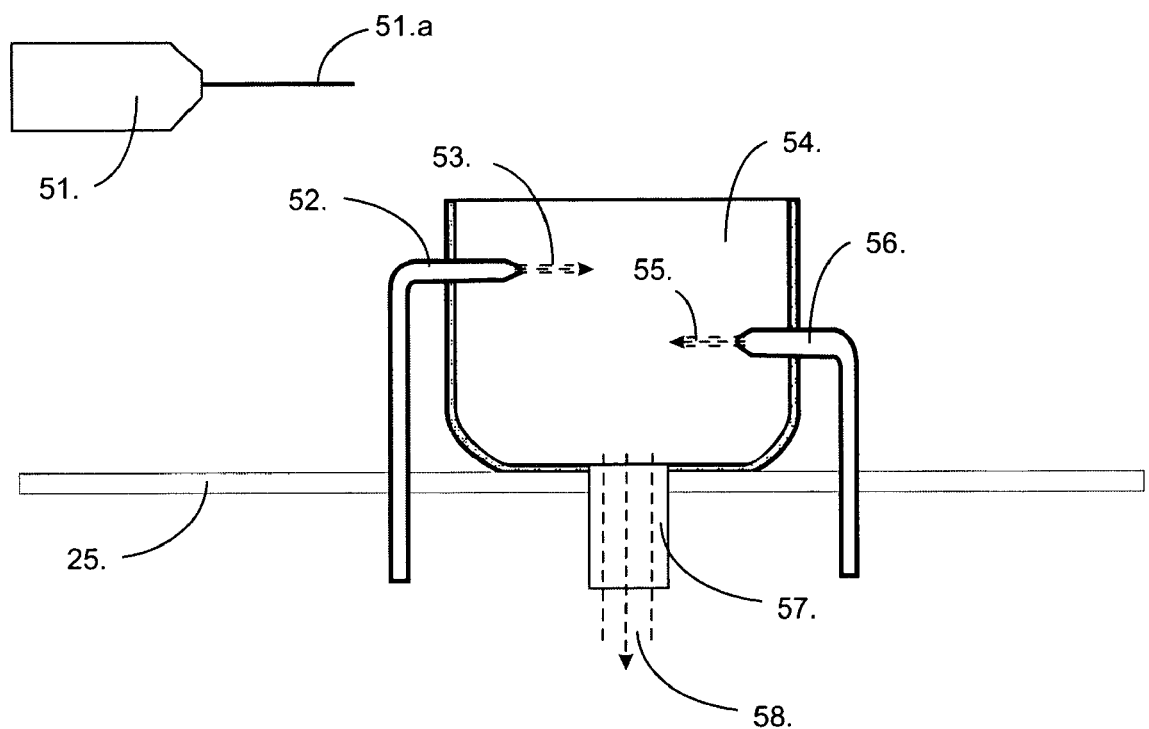
FIG. 34 is a side elevation view of a steam cleaning station which may be mounted on the work plate.

A separate cleaning and drying station may also be mounted on the work plate 25, as illustrated in FIG. 34. The cleaning and drying station comprises a steam cleaning tank 54 having a steam nozzle 56, an air duct 57 extending through the work plate from the base of the tank 54 and connected to the water filter 37 in the lower chamber so that air flows in direction 58 from the chamber, an air nozzle 52 for blowing air into the tank 54 in direction 53, and a laser lumen device 51 having a laser lumen sensor 51a. The laser lumen sensor 51a is used to determine if a desired quality of polishing has been achieved.

FIG. 36 is a schematic diagram of the pneumatic control system for the apparatus. On the right hand side, various pneumatic actuators for moving various parts of the apparatus are illustrated. These are the two finger gripper actuator 70 for the flip station, the pneumatic cylinder 27 for moving the tool bed 26, the pneumatic actuator 23 for the three finger gripper of the gripper unit, the pneumatic rotary cylinder 69 of the flip station, a cooling nozzle 79, the pneumatic cylinder actuators 101 to 106 for each of the rouge applicators at each polishing station as well as the crown polishing station, and the crown polishing tool position cylinder 107. The cooling nozzle 79 may be mounted on the y motor carrier or pitch plate 13 for directing a cooling air flow onto a ring or other workpiece carried by the gripper unit. This nozzle may be the end of a pneumatic pipe which is set along the electrical cable carriers of the gantry apparatus and then fixed to the interface or pitch plate 13.

Each rouge applicator cylinder is associated with two end position sensors (101a, 101b, 102a, 102b, . . . etc.) which indicate when the cylinder is in its fully retracted position and in its fully extended position. These sensors can be seen in the electronic control diagram of FIG. 37.

A pneumatic or pressurized air supply cylinder 82 is mounted in the lower housing 77 and is controlled by an input pressure regulator 80 and control pressure regulator 81. This arrangement is used to stabilize any air pressure oscillations and provide a unit work pressure of 0.6 MPa. Air supply to the actuator 70 is via a flip gripper input transducer 83 and solenoid valve 91. A force controller pressure tank 109 is connected to the force controller or slide cylinder 27 and the main air supply is also connected to cylinder 27 via pressure transducer 84. Transducer 84 is used to achieve the right force on the grinding wheel during grinding (or the polishing wheel during polishing). During grinding, the ring or other workpiece is pushed against the grinding wheel, and the force applied by the force controller or slide cylinder 27 will push back against the ring. The force selected depends on the grinding parameters of the jewelry and may be adjusted by the operator or under control of the software. As grinding takes place, the grinding wheel will follow the contour of the workpiece, also moving the sliding tool bed and actuator 27. At certain points during this movement, the actuator will need a fast replenishment of air, and also tends to cause pressure oscillations. The auxiliary pressure tank 109 takes care of both of these supply needs and eliminates any pressure disturbances in the system.

The gripper actuator 23 is connected to the air supply tank via transducer 85 and solenoid valve 92. Solenoid valve 93 controls air supply to the pneumatic rotary cylinder 69 of the flip station, while solenoid valve 94 controls air supply to the cooling nozzle 79. Each of the four rouge applicator cylinders 101, 102, 103 and 104 is connected to the pressurized air supply via a pressure regulator 87, 88, 89, and 90, respectively, and a solenoid valve 95, 96, 97 and 98, respectively. Rouge applicator cylinders 105, 106 are connected to the pressurized fluid supply via solenoid valves 99, 100, respectively. Finally, the positioning cylinder or force controller 107 for the crown polishing tool is connected to a crown polishing pressure tank 108, which operates in the same manner as the auxiliary pressure tank 109 of the sliding tool bed force controller or actuator 27, and is also connected to the pressurized fluid supply from tank 82 via pressure transducer 86 in order to vary the application force of the crown polishing tool.

FIG. 37 is a schematic diagram of the electronic control system for the apparatus of FIGS. 16 to 36. The automatic operation is controlled by a central computer or PC 111 which may be programmed by the operator to carry out specific functions. A motor input/output card 112 connects x and y gantry motors 118, 119 and motor drives 118a, 119a, respectively (which may be Aries servo drives manufactured by Parker, such as the SM160 servo drive) to the computer. The x gantry motor 118 will drive the gantry x axis carriage 59a along the gantry member 59 defining the x-axis. The y gantry motor 119 will drive the y axis carriages or sliders 60a along side rails 60 defining the y axis. Each motor drive is connected to a power supply at input 118b, 119b, respectively The second motor input/output card 113 of computer 111 is connected to the z gantry motor 120 and motor drive 120a connected to power supply at input 120b, and to the x rotary motor 9 of the gimbal unit via motor drive 9a connected to a power supply at input 9b. Motor drive 120a may also be an Aries servo drive or similar. Actuation of the z gantry motor will control driving of the z-axis carriages or sliders 61a (FIG. 1) along the vertical or z-axis gantry members 61. Actuation of x rotary motor 9 will control rotation of roll plate 14 of the gimbal unit.

The third motor input/output card 114 of computer 111 is connected to the other two motors of the gimbal unit, specifically the y and z gimbal rotary motors 10 and 11. Motor 10 is controlled via drive 10a and connected to a power supply at input 10b, while motor 11 is controlled via drive 11a and connected to a power supply at input 11b.

It will be recognized that control of the various motors for driving the gantry sliders and the gimbal plates will control the position and orientation of the gripper unit, and thus the position and orientation of any workpiece held by the gripper fingers.

Analog output card 115 of the computer 111 is connected to the four input transducers 83, 84, 85 and 86 of the flip gripper, force controller for the sliding tool bed, the three finger gripper of the gripper unit, and the crown force controller, respectively. It is also connected to a frequency motor regulator 121 for the grind motors 75 and 75a which drive the grind wheels 33, 33a, respectively, or the polishing wheels when the apparatus is in a polishing configuration.

A digital output card 116 is connected to all of the solenoid valves 91 to 100 and also to an alarm light 110. A digital input card 117 receives inputs from all of the sensors in the system, as indicated on the right hand side of FIG. 27. The sensors comprise the gimbal unit zero position sensors 123, 123a, two finger gripper sensors 73 of the flip station gripper 70, the force controller sensor 28 of the tool bed drive cylinder or force controller 27, the three finger gripper sensors 23a and 23b of the gripper unit 23, the flip station motor sensors 72, the rouge applicator sensors 101a, 101b to 106a, 106b, and the crown polishing tool position sensors 107a and 107b.

Operation of the system when the apparatus is set up for a grinding operation as in FIGS. 16 to 19 will now be described. This description assumes that the workpieces are rings, but it will be understood that the process will be similar for workpieces in the form of other types of jewelry or other articles having surfaces requiring grinding or material removal. The computer will have an input for an operator to initially enter parameters of the jewelry or other items to be processed, such as size and style. The operator may also enter ring or workpiece processing parameters, such as grinding force and motor speed, and travel paths for the workpiece. This may be done by first manually operating the system to process one workpiece, and training the system to process all remaining workpieces according to the same parameters. Alternatively each tray of workpieces may be associated with a bar code which identifies software instructions for operating the system in order to process the workpieces on the tray to desired specifications. In this case, the operator will simply scan the barcode before inserting the tray into the housing.

A suitable software system and method for controlling the apparatus of this invention is described in my copending application entitled Control System and Method for Jewelry Processing Apparatus, filed on even date herewith, and the contents of this application are incorporated herein by reference. However, it will be understood that other methods may alternatively be used for controlling the apparatus, and it may also be controlled manually.

During the grinding process, the air blowers 35 and vacuum motor of the water filter 37 will be on when any grinding wheel is activated, to ensure that metal particles or dust are removed from the work chamber 31 and can be recovered by the filter 37. The gantry motors are then controlled to move the gimbal unit until the gripper unit is located above a first ring 78 on tray 76. The gripper unit is then lowered until the three fingers 24 are located inside the ring, and the gripper is actuated to move the fingers outwardly to grip the inner surface of the ring. The gantry motors are then operated to lift the ring from its holder 205, and transport it to the first work station or sprue removal wheel 33. The gimbal unit motors will be operated to manipulate the ring in space during the grinding process as required, so that different portions are held against the grinding wheel 33, while the grinding wheel motor and the tool bed slide controller are activated so as to rotate the wheel at a selected speed and to apply a desired grinding force against the workpiece.

Once sprue removal is complete, the gimbal unit and gantry unit are controlled to move the ring to the next grinding wheel 33a and to orient the ring properly for contact with the wheel. The first grinding wheel is turned off and the second grinding wheel is activated at the desired grinding force and speed. The second grinding wheel 33a will be a contour grinding wheel for controlling the contour of the outer surface of the wheel. Again, the gimbal unit motors will be controlled in order to present different regions of the ring outer surface to the grinding wheel and grind the ring to the selected contour.

When all grinding operations for the outer surface of the ring are complete, the gantry and gimbal unit motors will be controlled in order to move the ring to the flip station. The flip station will be actuated in order to grip the ring on the outside, and the gripper unit will be actuated in order to release the ring. The gripper unit is then moved away from the flip station, and back in to grip the ring on the outside. The flip station grip fingers are then released, and the gantry motors are controlled to move the ring back to the first or sprue removal wheel, so that the inside surface of the ring can be machined on the smaller grind wheel. The grinding steps are then repeated in order to grind the inner surface of the ring to the desired contour.

The grinding apparatus can also be used for a lapping operation in which the sprue is ground off from the opposite side edges of the ring. With the ring gripped appropriately by the gripper fingers, and the gimbal unit controlled to hold the ring vertically, a first side edge of the ring will be held against lapping wheel 33a (FIG. 31a) to remove sprue from that side edge. The ring is then moved to the flip station and reversed so that the opposite side edge can be held against the grinding wheel for sprue removal or lapping.

With the grinding wheel arrangement of FIG. 31a, the ring will first be held vertically with opposite side faces held against lapping wheel 33a and then held horizontally against the other grinding wheels at the two stations in succession in order to grind the outer and inner surfaces as desired.

Once the inner and outer surfaces and side edges of the ring have been appropriately finished, the ring will be returned to the storage tray 76 or to another storage tray for holding partially processed workpieces.

The grinding procedure will be carried out for all rings on the first tray 76. If a larger capacity is desired, the apparatus dimensions may be increased to include additional holding trays for unprocessed workpieces. This can permit a so-called "lights-out" or overnight operating mode.

When all the unprocessed workpieces have undergone the programmed grinding operation, the apparatus must be re-configured for the polishing operation. This is done by removing the grinding wheels and replacing them with polishing wheels, as illustrated in FIG. 32. The gantry unit is then controlled to move the gripper unit to the tray and to pick up the first partially processed ring in the same manner as before. As with the grinding wheels, the polishing wheels are driven by motors 75 and 75a at a variable speed, and the polishing force applied will be controlled by the cylinder actuator for the tool bed slider. The tool bed has an integral position sensor for detecting when the workpiece comes into contact with the polishing wheel. In performing a polishing operation, the controller also moves the rouge applicator into contact with the polishing wheel and controls the amount of rouge applied.

Once the first stage polishing is complete, the gantry and gimbal units are controlled to move the workpiece to the second polishing wheel, and the second polishing wheel and associated rouge applicator are actuated to carry out the programmed polishing operation. After polishing of a first surface of the workpiece is complete (for example the outer surface of a ring), the workpiece is moved to the re-gripping or flip station, and the grip is changed so that a different surface can be polished, such as the inside of the ring. After polishing of the basic surfaces is complete, the gantry system may take the workpiece or ring to the crown polishing station of FIG. 33. The tool head is driven by actuator 47 to apply the desired polishing force, and the tool head angle is adjusted as necessary to polish the crown, while the gimbal unit may also be controlled to change the orientation of the crown relative to the tool head. At the same time, a controlled amount of rouge is applied by applicator 46.

After all polishing is complete, the gantry system may be controlled to transport the workpiece to a separate cleaning and drying station as illustrated in FIG. 34. The gantry and gripper unit will be controlled to lower the workpiece into tank 54 until it is aligned with the steam nozzle 55, and steam will then be applied to clean the workpiece while the gimbal unit is controlled to manipulate it so that all surfaces are presented for steam cleaning. It is then moved adjacent the air nozzle 52, and air is blown over the workpiece in order to dry it. The laser lumen sensor 51a may be used to determine if the desired quality of polishing has been achieved. If not, the workpiece can be returned to the first polishing station to complete the process.

When polishing and cleaning is complete, the gantry and gripper units are controlled to transport the ring to a soft tray on which it can be dropped. The next workpiece can then be picked up for polishing.

When the gantry and gimbal unit is configured with a gripper unit as in FIGS. 13 to 19, it can be controlled to move any desired workpiece from a storage tray through various processing stations and then to return the workpiece to a final tray for finished product. The gantry and gimbal arrangement has advantages over an articulated robotic arm, as was used in the past, since it is simpler, less expensive, and more versatile, and also takes up less space.

FIG. 35 illustrates an alternative arrangement of the gantry and gimbal unit in which a laser unit 63 is exchanged for the gripper unit 23 of the previous embodiment. The gimbal unit 64 in this embodiment is a two DOF unit as illustrated in FIG. 8. In this alternative, the roll motor 11 of the gimbal unit is first removed, since the gimbal unit requires only two degrees of freedom for the laser processing operation, and the z ball bearing assembly 20 is replaced with an interface plate 20a on which the laser unit 63 may be mounted. The laser head is then attached to the gimbal unit by suitable fastener devices. An alloy powder dispensing nozzle 67 is attached to the laser unit. A workpiece 65 such as a piece of jewelry is held in a generally vertical orientation by a suitable stationary gripper 66 on the work plate 25.

This arrangement may be used for manufacture, repair, or engraving of jewelry pieces, as well as polishing. The laser is turned on along with the powder deposition system. As it is manipulated in space by the gimbal unit, the laser beam 68 will melt the powder emitted from nozzle 67 in order to either repair or create a jewelry piece based on programmed instructions. The laser beam alone may be used for engraving purposes, eliminating the need for a manual stamping process in jewelry manufacture. The computer 111 may use data scanned from an existing piece of jewelry or other part in order to create motion programs for the gantry and gimbal system that are then used to repair or re-size a piece of jewelry. CAD drawings may be entered in the computer in order to create program instructions for the gantry and gimbal motion software so as to create a part corresponding to the CAD drawings.

Figure 39:
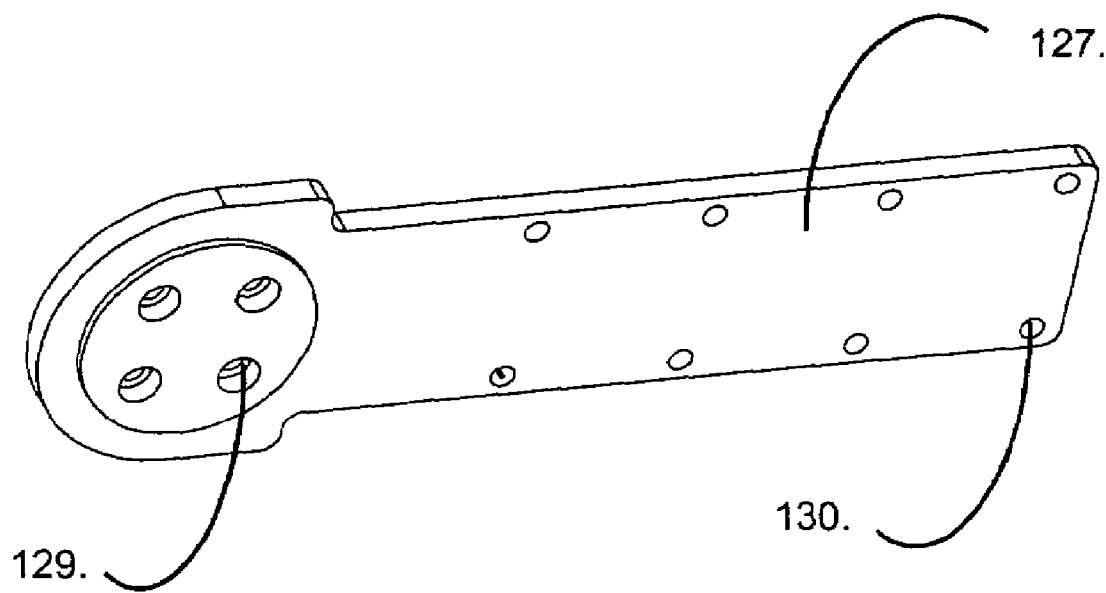
FIG. 39 is a perspective view of the gimbal adapter or interface plate for the apparatus of FIG. 38.

FIGS. 38 and 39 illustrate how the gimbal unit 74 of FIGS. 1 to 14 may be mounted on a robot assembly 126, such as a robot assembly manufactured by Fanuc Robotics America, Inc. of Rochester Hills, Mich., for example the LRMATE 200i B robot. This extends a 6 DOF robot with up to three additional DOF, i.e. up to a 9 DOF robot. An interface plate 127 secured to the yaw plate 13 connects the robot $6^{th}$ axis or end 128 of the robot arm to the gimbal unit. As best illustrated in FIG. 39, interface plate 127 has holes 129 for receiving fastener screws for attachment to the robot $6^{th}$ axis or end 128, and holes 130 for receiving fastener screws for attachment to the gimbal yaw plate 13.

The modular gimbal unit of this invention is extremely versatile in allowing positioning systems such as gantries and robots to be extended by an additional two or three degrees of freedom. The unit has an adapter plate for readily mounting the unit on a slider of a 3 DOF gantry system or on the end of a robotic arm, as well as an adapter plate for readily mounting a gripper unit or a tool on the end of the gimbal unit. Due to its modular design, the gimbal unit can also easily be converted from a 3 DOF unit to a 2 DOF unit.

The combined gantry and gimbal apparatus described above allows a gantry system to be used for jewelry processing. A gantry configuration has never been used for jewelry processing before, due to the limitations of a 3 DOF gantry slider system in manipulating a jewelry workpiece. The gimbal unit of this invention can expand the market for gantry systems to allow their use in situations requiring a 6 DOF manipulation of a workpiece, which has typically required a robot assembly in the past. The combined gantry and gimbal apparatus will be simpler and less expensive to operate than an articulated robot assembly.

The gimbal unit 74 is stand alone and modular, and therefore enables any positioning system to be modified to provide an additional three degrees of freedom. This allows a gantry system to be readily upgraded to six degrees of freedom, potential making such systems competitive with articulated robot positioning systems. The upgraded gantry system will be simpler and less expensive than a 6 DOF robot.

When configured as a positioning apparatus for a jewelry processing system, the gantry and gimbal apparatus of this invention will be more economical and consistent than manual grinding and polishing processes of the prior art, and will produce a more predictable product. The apparatus is capable of taking off a consistent amount of material during a contour grinding pass, resulting in a more consistent end result. Unlike previous jewelry processing techniques, which were only partially automated, the system and apparatus of this invention allows each of the following operations to be performed at one location using one basic apparatus:

(a) Sprue removal;
(b) outside/inside contour grind;
(c) lapping;
(d) outside/inside polishing; and
(e) crown polishing.

The self contained precious metal water based collecting system incorporated in the apparatus collects most or all of the metal dust created during processing, so that it will be less likely to damage moving parts of the machine, and also allows recovery of precious metal for re-use. The system can be configured to grind rings or flats by use of suitable grippers. It can perform a lapping operation on a ring without requiring a separate lapping station, as was necessary in the past, since the gripper unit and flip station can re-position a ring so as to present a side face of the ring to the grinding or polishing tool.

The sliding tool bed allows force controlled material removal when grinding or polishing. The use of sliders avoids the need for a passive force control device. The amount of material removed during grinding can be readily controlled based on parameters such as the applied force and the shape and dimensions of the part being machined. The system is also readily expandable to add more work stations as needed, simply by increasing the size of the work plate to allow increased working capacity without requiring conveyors, feeders, or stackers. This can also allow "lights out" operation since the work table can be sized to allow multiple trays carrying work pieces to be placed on the table for successive processing. This allows the system to run overnight or over weekends without attendance.

The jewelry processing system is also provided with a separate wash and dry station with a reflective sensor for determining the quality of the polished surface, so that further polishing can be carried out if necessary. A separate crown polishing station is also provided if needed for jewelry having crowns.

The system can be readily modified for jewelry creation or processing using a laser, simply by mounting a laser and powder deposition device on the gimbal unit in place of the gripper unit, as illustrated in FIGS. 8 and 35. With this arrangement, the system can be controlled to polish or engrave using the laser, including the engraving of stamp marks into a ring. This eliminates the stamping and subsequent rounding process as typically required for such an operation. The laser system can also be controlled to build a jewelry piece based on CAD drawings or 3D scanned data, eliminating the multiple steps of master modeling, wax modeling, investment casting, and sprue grinding.

Although some exemplary embodiments of the invention have been described above by way of example only, it will be understood by those skilled in the field that modifications may be made to the disclosed embodiments without departing from the scope of the invention, which is defined by the appended claims.

The invention claims is:

1. A positioning apparatus for a modular interchangeable multiple-degree-of-freedom robotic system, comprising:
   a gantry unit having a frame, a horizontal work plate mounted on the frame, a first slider slidably mounted on the frame for movement in a first linear direction, a second slider slidably mounted on the first slider for movement in a second linear direction perpendicular to the first direction, and a third slider slidably mounted on the second slider for movement in a third linear direction perpendicular to the first and second directions;
   a gimbal unit mounted on the third slider above the work plate, the gimbal unit having at least two perpendicular rotational degrees of freedom and a mounting device for mounting a part on the gimbal unit, and wherein the gimbal unit is releasably securable to a plurality of drive means, with each drive means having an associated rotatable member, thereby allowing a plurality of combinations of degrees of freedom of a resultant combined gimbal and gantry system, thereby allowing for controlled movement of workpieces for processing; and
   a programmable controller for controlling movement of the first, second and third sliders and rotation of the part mounted on the gimbal unit about two perpendicular axes of rotation according to pre-programmed specifications;
   whereby the part can be located at a selected position on the work plate and at a selected orientation.

2. The apparatus as claimed in claim 1, wherein the gimbal unit has three rotational degrees of freedom (DOF) and comprises a first rotary member for rotation about a first axis, a first drive means for rotating the first rotary member, a second drive means carried by the first rotary member, a second rotary member driven by the second drive means and rotatable about a second axis perpendicular to the first axis when the members are in the start position, a third drive means carried by the second rotary member, and a third rotary member driven by the third drive means for rotation about a third axis perpendicular to the first and second axes when the first and second rotary members are in the start position.

3. The apparatus as claimed in claim 2, wherein the gimbal unit is modular and the third drive means and third rotary members are removable to convert the three DOF gimbal unit into a two DOF gimbal unit.

4. The apparatus as claimed in claim 2, wherein the gimbal unit includes a sensor assembly for sensing a zero position in which the axes of rotation of the gimbal unit are perpendicular, the sensor assembly having an output connected to said controller, and said controller has outputs for controlling operation of the first, second and third drive means of the gimbal unit.

5. The apparatus as claimed in claim 1, further comprising a gripper assembly mounted on the gimbal unit mounting device, the gripper assembly having gripper means for holding and transporting a work piece between a plurality of work stations on the horizontal work plate.

6. The apparatus as claimed in claim 1, further comprising a laser assembly mounted on the gimbal unit mounting device.

7. The apparatus as claimed in claim 1, further comprising a tool bed slidably mounted on the work plate and a slider drive for applying a variable force to the tool bed, the controller having an output for controlling the tool bed slider drive.

8. The apparatus as claimed in claim 7, including a sensor for detecting the position of the sliding tool bed, the sensor having an output connected to the controller.

9. A positioning apparatus, comprising:
a gantry unit having a frame, a horizontal work plate mounted on the frame, a first slider slidably mounted on the frame for movement in a first linear direction, a second slider slidably mounted on the first slider for movement in a second linear direction perpendicular to the first direction, and a third slider slidably mounted on the second slider for movement in a third linear direction perpendicular to the first and second directions;
a gimbal unit mounted on the third slider above the work plate, the gimbal unit having at least two perpendicular rotational degrees of freedom and a mounting device for mounting a part on the gimbal unit; and
a controller for controlling movement of the first, second and third sliders and rotation of the part mounted on the gimbal unit about two perpendicular axes of rotation; and
a laser assembly mounted on the gimbal mounting device, whereby the part can be located at a selected position on the work plate and at a selected orientation, and wherein the laser assembly comprises a laser and a precious metal deposition device for creating of a desired metal part.

10. A positioning apparatus for a modular multiple-degree-of-freedom robotic system, comprising:
a robotic positioning assembly having six degrees of freedom, the assembly having an outer end member for mounting of a part to be positioned by the robotic assembly;
a gimbal unit mounted on the outer end member of the robotic assembly, the gimbal unit having at least two perpendicular rotational degrees of freedom and a mounting device for mounting a part on the gimbal unit, and wherein the gimbal unit is releasably securable to a plurality of drive means, with each drive means having an associated rotatable member, thereby allowing a plurality of combinations of degrees of freedom of a resultant combined gimbal and gantry system, thereby allowing for controlled movement of workpieces for processing; and
a control unit for controlling the position of the robotic positioning assembly and the gimbal unit according to pre-programmed specifications,
whereby the part can be positioned with at least eight degrees of freedom by the control unit and the robotic positioning apparatus.

11. The apparatus as claimed in claim 10, wherein the gimbal unit has three rotational degrees of freedom (DOF) and comprises a first rotary member for rotation about a first axis, a first drive means for rotating the first rotary member, a carrier member supporting the first drive means, a second drive means carried by the first rotary member, a second rotary member driven by the second drive means and rotatable about a second axis perpendicular to the first axis when the members are in the start position, a third drive means carried by the second rotary member, and a third rotary member driven by the third drive means for rotation about a third axis perpendicular to the first and second axes when the first and second rotary members are in the start position, and an interface plate having a first end secured to the carrier member and a second end secured to the outer end member of the robotic assembly to provide a nine DOF robotic positioning assembly.

12. A multiple-degree-of-freedom robotic processing system for processing parts, comprising:
a gantry unit having a frame, a horizontal work plate mounted on the frame, a first slider slidably mounted on the frame for movement in a first linear direction, a second slider slidably mounted on the first slider for movement in a second linear direction perpendicular to the first direction, and a third slider slidably mounted on the second slider for movement in a third linear direction perpendicular to the first and second directions;
a gimbal unit mounted on the third slider above the work plate, the gimbal unit having at least two perpendicular rotational degrees of freedom and a mounting device for mounting a part on the gimbal unit, and wherein the gimbal unit is releasably securable to a plurality of drive means, with each drive means having an associated rotatable member, thereby allowing a plurality of combinations of degrees of freedom of a resultant combined gimbal and gantry system, thereby allowing for controlled movement of workpieces for processing;
a plurality of work stations mounted on the work plate; and
a programmable controller for controlling movement of the first, second and third sliders and rotation of the part mounted on the gimbal unit about two perpendicular axes of rotation, whereby the part can be located at a selected work station to address a tool at the work station and at a selected orientation relative to the tool according to specifications programmed into the programmable controller.

13. The apparatus as claimed in claim 12, wherein the gimbal unit has three rotational degrees of freedom (DOF) and comprises a first rotary member for rotation about a first axis, a first drive means for rotating the first rotary member, a second drive means carried by the first rotary member, a second rotary member driven by the second drive means and rotatable about a second axis perpendicular to the first axis when the members are in the start position, a third drive means carried by the second rotary member, and a third rotary member driven by the third drive means for rotation about a third axis perpendicular to the first and second axes when the first and second rotary members are in the start position.

14. The apparatus as claimed in claim 13, wherein the mounting device comprises a gripper assembly secured to said third rotary member and having a gripper for holding a part.

15. The system as claimed in claim 14, wherein the work stations include at least two grinding stations.

16. The system as claimed in claim 15 wherein the grinding stations are removably mounted on the work plate, and the work stations further comprise at least two polishing stations for selectively mounting on the work plate in place of the grinding stations.

17. The system as claimed in claim 12, further comprising an outer housing enclosing the frame and work plate, and a collection system for collecting metal scrap removed at least at some of said work stations.

18. The system as claimed in claim 17, wherein the collection system comprises a series of air ducts directing a flow of air across a tool at each work station, an air collecting duct on the opposite side of each tool, and a filter device connected to the air collecting duct for filtering metal particles from the collected air flow.

19. A processing system for processing parts, comprising:
a gantry unit having a frame, a horizontal work plate mounted on the frame, a first slider slidably mounted on the frame for movement in a first linear direction, a second slider slidably mounted on the first slider for movement in a second linear direction perpendicular to the first direction, and a third slider slidably mounted on the second slider for movement in a third linear direction perpendicular to the first and second directions;
a gimbal unit mounted on the third slider above the work plate, the gimbal unit having at least two perpendicular rotational degrees of freedom and a mounting device for mounting a part on the gimbal unit, wherein the gimbal unit has three rotational degrees of freedom (DOF) and comprises a first rotary member for rotation about a first axis, a first drive means for rotating the first rotary member, a second drive means carried by the first rotary member, a second rotary member driven by the second drive means and rotatable about a second axis perpendicular to the first axis when the members are in the start position, a third drive means carried by the second rotary member, and a third rotary member driven by the third drive means for rotation about a third axis perpendicular to the first and second axes when the first and second rotary members are in the start position, and wherein the mounting device comprises a gripper assembly secured to said third rotary member and having a gripper for holding a part;
a plurality of work stations mounted on the work plate, wherein the work stations include at least two grinding stations; and
a controller for controlling movement of the first, second and third sliders and rotation of the part mounted on the gimbal unit about two perpendicular axes of rotation, whereby the part can be located at a selected work station to address a tool at the work station and at a selected orientation relative to the tool; and
a tool bed slidably mounted on the work plate and a slider drive for applying a sliding drive to the tool bed, at least the grinding stations being mounted on the slidable tool bed whereby a variable force can be applied by a grinding tool against the part.

20. The system as claimed in claim 19, wherein the controller has an output for controlling said slider drive and a sensor associated with the slider drive has an output connected to said controller.

21. The system as claimed in claim 20, wherein the work stations further comprise a flip station mounted on the work plate for changing the orientation of a part held by said gripper, whereby a different surface of the part may be addressed by a tool at a work station.

22. A processing system for processing parts, comprising:
a gantry unit having a frame, a horizontal work plate mounted on the frame, a first slider slidably mounted on the frame for movement in a first linear direction, a second slider slidably mounted on the first slider for movement in a second linear direction perpendicular to the first direction, and a third slider slidably mounted on the second slider for movement in a third linear direction perpendicular to the first and second directions;
a gimbal unit mounted on the third slider above the work plate, the gimbal unit having at least two perpendicular rotational degrees of freedom and a mounting device for mounting a part on the gimbal unit, wherein the gimbal unit has three rotational degrees of freedom (DOF) and comprises a first rotary member for rotation about a first axis, a first drive means for rotating the first rotary member, a second drive means carried by the first rotary member, a second rotary member driven by the second drive means and rotatable about a second axis perpendicular to the first axis when the members are in the start position, a third drive means carried by the second rotary member, and a third rotary member driven by the third drive means for rotation about a third axis perpendicular to the first and second axes when the first and second rotary members are in the start position, and wherein the mounting device comprises a gripper assembly secured to said third rotary member and having a gripper for holding a part;
a plurality of work stations mounted on the work plate, wherein the work stations include at least two grinding stations, and wherein the grinding stations are removably mounted on the work plate, and the work stations further comprise at least two polishing stations for selectively mounting on the work plate in place of the grinding stations; and
a controller for controlling movement of the first, second and third sliders and rotation of the part mounted on the gimbal unit about two perpendicular axes of rotation, whereby the part can be located at a selected work station to address a tool at the work station and at a selected orientation relative to the tool, and wherein the work stations further comprise a separate crown polishing station mounted on the work plate.

23. A processing system for processing parts, comprising:
a gantry unit having a frame, a horizontal work plate mounted on the frame, a first slider slidably mounted on the frame for movement in a first linear direction, a second slider slidably mounted on the first slider for movement in a second linear direction perpendicular to the first direction, and a third slider slidably mounted on the second slider for movement in a third linear direction perpendicular to the first and second directions;
a gimbal unit mounted on the third slider above the work plate, the gimbal unit having at least two perpendicular rotational degrees of freedom and a mounting device for mounting a part on the gimbal unit, wherein the gimbal unit has three rotational degrees of freedom (DOF) and comprises a first rotary member for rotation about a first axis, a first drive means for rotating the first rotary member, a second drive means carried by the first rotary member, a second rotary member driven by the second drive means and rotatable about a second axis perpendicular to the first axis when the members are in the start position, a third drive means carried by the second rotary member, and a third rotary member driven by the third drive means for rotation about a third axis perpendicular to the first and second axes when the first and second rotary members are in the start position, and wherein the mounting device comprises a gripper assembly secured to said third rotary member and having a gripper for holding a part;
a plurality of work stations mounted on the work plate, wherein the work stations include at least two grinding stations, and wherein the grinding stations are removably mounted on the work plate, and the work stations further comprise at least two polishing stations for selectively mounting on the work plate in place of the grinding stations; and a controller for controlling movement of the first, second and third sliders and rotation of the part mounted on the gimbal unit about two perpendicular axes of rotation, whereby the part can be located at a selected work station to address a tool at the work station and at a selected orientation relative to the tool, and wherein the work stations further comprise a cleaning and drying station.

24. The system as claimed in claim 23, further comprising a sensor located at said cleaning and drying station for detecting the quality of a polished surface of a part, the sensor having an output connected to the controller and the controller further comprising means for moving the part back to polishing stations if the polishing is detected to be insufficient.

25. A method of positioning a part, comprising the steps of:

mounting a part to be manipulated on a gimbal unit having at least two rotational axes, the gimbal unit being suspended from a linear slider of a gantry unit having a first linear slider movable along a first axis, a second linear slider mounted on the first linear slider and movable along a second axis perpendicular to the first axis, and a third linear slider mounted on the second linear slider and movable along a third axis perpendicular to the first and second axes;

controlling drive means for the three linear sliders to move the part to a location adjacent at least one work station; and controlling drive means for the gimbal unit to manipulate the part into desired orientations in order to complete a procedure at the work station, wherein the part mounted on the gimbal unit is a combined laser and powder deposition unit, and the step of controlling the part comprises moving the laser and powder deposition unit to a location adjacent a work station for creation of an item, controlling the gimbal unit to move the laser and powder deposition unit in space and controlling the laser unit and powder deposition unit to dispense metal powder onto the work station and to melt the powder to create an item of a selected shape.

26. The method as claimed in claim 25, wherein the item is a piece of jewelry.

* * * * *